US011180209B2

(12) United States Patent
Koepke

(10) Patent No.: US 11,180,209 B2
(45) Date of Patent: Nov. 23, 2021

(54) BICYCLE STORAGE ASSEMBLY

(71) Applicant: DROPBIKES LLC, Lewisville, TX (US)

(72) Inventor: Timothy A. Koepke, Tabernash, CO (US)

(73) Assignee: Timothy A. Koepke, Tabernash, CO (US)

( * ) Notice: Subject to any disclaimer, the term of this patent is extended or adjusted under 35 U.S.C. 154(b) by 0 days.

(21) Appl. No.: 16/605,172

(22) PCT Filed: Apr. 13, 2018

(86) PCT No.: PCT/US2018/027608
§ 371 (c)(1),
(2) Date: Oct. 14, 2019

(87) PCT Pub. No.: WO2018/191687
PCT Pub. Date: Oct. 18, 2018

(65) Prior Publication Data
US 2020/0039593 A1 Feb. 6, 2020

Related U.S. Application Data

(60) Provisional application No. 62/485,383, filed on Apr. 14, 2017.

(51) Int. Cl.
*B62H 3/12* (2006.01)
*B66F 11/00* (2006.01)
*E04H 6/06* (2006.01)

(52) U.S. Cl.
CPC ............... *B62H 3/12* (2013.01); *B66F 11/00* (2013.01); *E04H 6/06* (2013.01)

(58) Field of Classification Search
CPC .. E04H 6/005; B62H 3/12; B62H 3/08; B62H 3/04; B62H 3/00
See application file for complete search history.

(56) References Cited

U.S. PATENT DOCUMENTS

| 1,232,501 A | 7/1917 | Colen |
| 2,562,593 A | 7/1951 | Adams |

(Continued)

FOREIGN PATENT DOCUMENTS

| DE | 112780 C | 8/1899 |
| DE | 3611532 A1 | 11/1986 |

(Continued)

OTHER PUBLICATIONS

European Search Report and Written Opinion for International patent application No. PCT/US2012/046315, filed Nov. 7, 2012.

*Primary Examiner* — Gisele D Ford
(74) *Attorney, Agent, or Firm* — Steven M. Koehler; Westman, Champlin & Koehler, P.A.

(57) ABSTRACT

A bicycle storage assembly includes a vertically oriented track. A carriage is movable on the track from a loading position to a storage position, the storage position being elevated above the loading position. The carriage holds a tire and wheel assembly of the bicycle above the other in a storage, elevated position. In a first aspect the carriage comprising a pair of clamping members being devoid of any element that extends over an inside circumferential surface of a rim of the front or rear tire and wheel assembly in the storage position. A second aspect has nested enclosures to reduce storage space. A third aspect includes a movable member coupled to the carriage. The movable member inhibits removal of the bicycle in the storage position.

20 Claims, 20 Drawing Sheets

(56) References Cited

U.S. PATENT DOCUMENTS

| | | | |
|---|---|---|---|
| 2,589,598 A | 3/1952 | Belew | |
| 3,254,928 A | 6/1966 | Clatterbuck | |
| 3,682,523 A | 8/1972 | Esposito | |
| 3,770,133 A | 11/1973 | Kolker | |
| 3,967,425 A | 7/1976 | Wolverton | |
| 3,973,812 A | 8/1976 | Poltorak | |
| 4,269,049 A | 5/1981 | Henderson | |
| 4,316,544 A | 2/1982 | Goldstein | |
| 5,690,234 A | 11/1997 | Rhead | |
| 5,802,889 A | 9/1998 | Arnold | |
| 5,917,407 A * | 6/1999 | Squire | B62H 3/00 194/205 |
| 5,944,198 A | 8/1999 | Ihalainen | |
| 5,979,120 A | 11/1999 | Hollstedt | |
| 6,164,459 A | 12/2000 | Liem | |
| 6,779,310 B2 | 8/2004 | Grover | |
| 7,021,474 B2 | 4/2006 | Simon | |
| 7,481,027 B2 | 1/2009 | Blume | |
| 7,694,830 B1 | 4/2010 | Larson | |
| 2005/0284036 A1 | 12/2005 | Blume | |
| 2010/0163503 A1 * | 7/2010 | Kelly | B62H 3/00 211/85.3 |
| 2011/0114143 A1 | 5/2011 | Ohlman | |
| 2012/0128453 A1 * | 5/2012 | Lee | E04H 6/005 414/232 |
| 2013/0270201 A1 * | 10/2013 | Vineyard | B62H 3/06 211/21 |
| 2016/0325798 A1 * | 11/2016 | McPherson | B65D 88/546 |
| 2016/0333601 A1 * | 11/2016 | Kwon | E04H 6/12 |
| 2017/0282868 A1 * | 10/2017 | Mondro | B60S 13/02 |
| 2020/0080333 A1 * | 3/2020 | Zahn | E04H 6/005 |
| 2020/0141147 A1 * | 5/2020 | Mingyan | G06Q 30/0284 |

FOREIGN PATENT DOCUMENTS

| | | |
|---|---|---|
| DE | 4308760 A1 | 11/1993 |
| EP | 0634317 A1 | 1/1995 |
| FR | 2546123 A1 | 11/1984 |
| FR | 2578803 A1 | 9/1986 |
| JP | 63-200676 | 8/1988 |
| JP | 3128781 A | 5/1991 |
| JP | 3273981 A | 12/1991 |
| WO | 82/00023 A1 | 1/1982 |
| WO | 97/14861 A1 | 4/1997 |
| WO | WO2014184817 A1 * | 5/2014 |

* cited by examiner

BICYCLE STORAGE ASSEMBLY

CROSS-REFERENCE TO RELATED APPLICATION

The present application is a national stage of and claims priority of International patent application Serial No. PCT/US2018/027608, filed Apr. 13, 2018, and published in English the content of which is hereby incorporated by reference in its entirety.

BACKGROUND

The discussion below is merely provided for general background information and is not intended to be used as an aid to determine the scope of the subject matter.

Aspects of the disclosure relate to the storage of bicycles or the like; and in a particularly advantageous embodiment, to units for storing a number of bicycles in a small space.

There has been increased interest in the effects caused by pollution in the environment. Automobiles, particularly in metropolitan areas, are considered one of the biggest causes of pollution. The pollution is even more prevalent due to the congestion caused by commuters from outlying areas traveling into the metropolitan areas on a daily basis.

Accordingly, it has been suggested to use alternate means of transportation from outlying areas to the commuter's place of employment. For example, it has been suggested that rapid transit systems can transport commuters by electric trains or the like from outlying sections to a centrally located metropolitan area. However, generally, the commuter must first get from his home to one of the stations along the rapid transit system and this distance may be quite far. Thus, the use of the automobile by the commuter is not entirely eliminated.

To solve this problem, it has been suggested to use bicycles to cover the relatively short distance from the commuter's home to the rapid transit station. In addition to being nonpolluting, the cyclist obtains useful exercise during this portion of his commute. However, once the cyclist arrives at his destination, it is necessary that he has a place to store his bicycle in a manner preventing theft or the like and protecting it from adverse weather conditions. If a large number of commuters are encouraged to use this form of transportation, storage facilities at such stations would become a problem. Further, once the cyclist-commuter arrived at his destination in the metropolitan area, he may again have a relatively great distance to cover to get to his place of employment. A bicycle at this point would be a considerable advantage; however, the problems of storing and renting such bicycles again exists.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages rioted in the Background.

One general aspect includes a bicycle storage assembly having a vertically oriented track and a carriage movable on the track from a loading position to a storage position, the storage position being elevated above the loading position. The carriage includes a support configured to hold one of a front tire and wheel assembly or a rear tire and wheel assembly of a bicycle in the storage position where the other of the front tire and wheel assembly or the rear tire wheel assembly not being held by the support is located below the front tire and wheel assembly or the rear tire and wheel assembly on the support. The support includes a pair of clamping members at least one of the clamping member being configured to move toward and away from the other clamping member. The clamping members are configured to engage opposed side surfaces of a tire of the bicycle, the support being devoid of any element that extends over an inside circumferential surface of a rim of the front or rear tire and wheel assembly in the storage position.

Another general aspect includes a bicycle storage assembly having a vertically oriented track and a carriage movable on the track from a loading position to a storage position, the storage position being elevated above the loading position. The carriage includes a support configured to hold one of a front tire and wheel assembly or a rear tire and wheel assembly of a bicycle in the storage position where the other of the front tire and wheel assembly or the rear tire wheel assembly not being held by the support is located below the front tire and wheel assembly or the rear tire and wheel assembly on the support. A frame has sides forming an at least partially enclosed space. The at least partially enclosed space has a first portion and a second portion with an access opening for placing the bicycle in the loading position. The first portion is narrower in width than the second portion, the track being disposed in the first portion.

Yet another general aspect includes a bicycle storage assembly having a vertically oriented track and a carriage movable on the track from a loading position to a storage position, the storage position being elevated above the loading position. The carriage includes a support configured to hold one of a front tire and wheel assembly or a rear tire and wheel assembly of a bicycle in the storage position where the other of the front tire and wheel assembly or the rear tire wheel assembly not being held by the support is located below the front tire and wheel assembly or the rear tire and wheel assembly on the support. The bicycle storage assembly also includes a movable element connected to the carriage and movable from a first position allowing the bicycle to be placed on the support in the loading position to a second position where the movable element inhibits removal of the bicycle from the support in the storage position.

Yet another general aspect includes a bicycle storage assembly having a vertically oriented track and a carriage movable on the track from a loading position to a storage position, the storage position being elevated above the loading position. The carriage includes a support configured to hold one of a front tire and wheel assembly or a rear tire and wheel assembly of a bicycle in the storage position where the other of the front tire and wheel assembly or the rear tire wheel assembly not being held by the support is located below the front tire and wheel assembly or the rear tire and wheel assembly on the support. The bicycle storage assembly also includes an enclosure with a movable member enclosing the bicycle at least partially within the enclosure when the movable member of the enclosure is in a closed position.

If not already provided in the afore-mentioned aspects the bicycle storage assembly can include any of the following features alone or in combination.

The support or carriage is devoid of any element that extends over an inside circumferential surface of a rim of the front or rear tire and wheel assembly in the storage position, or is devoid of any element that extends through spaces between spokes of the tire and wheel assembly.

The carriage can include a drive assembly operatively coupled to the support to control movement of the clamping member(s) such that in a lower position of the support on the track the clamping members are spaced apart from each other so as to allow a tire and wheel assembly to be placed therebetween and in a position of the support on the track higher than the lower position, the clamping members are configured to engage and hold a tire of the tire and wheel assembly. The drive assembly can include a rotatable element connected to each clamping member that moves. A spring for each clamping member that moves can be configured to urge movement of the clamping member that moves. The drive assembly can include a drive link that contacts or is driven by a stop in the loading position to urge movement of the drive link.

A frame can be provided and have an access opening for placing the bicycle in the loading position. The frame can include a door enclosing the bicycle within the frame when the door of the enclosure is in a closed position. The frame can have sides forming an at least partially enclosed space, the at least partially enclosed space having a first portion and a second portion, the first portion being narrower in width than the second portion, the track being disposed in the first portion, the access opening being in the second portion. A width of the first portion can be approximately one half a width of the second portion. The width of the first portion can be configured to accommodate a complete width of pedal crank assembly of a bicycle from a remote end of a left hand pedal to a remote end of a right hand pedal in at least the storage position.

The bicycle storage assembly can further include a second track and a second set of sides forming a second at least partially enclosed space, the second at least partially enclosed space having a first portion and a second portion having an access opening in the second portion for placing the bicycle in the loading position, the first portion being narrower in width than the second portion, where the second track is disposed in the first portion of the second at least partially enclosed space. The second set of sides forming the second at least partially enclosed space are disposed on a first side of the at least partially enclosed space. If desired, the bicycle storage assembly can further include a third track and a third set of sides forming a third at least partially enclosed space, the third at least partially enclosed space having a first portion and a second portion having an access opening in the second portion for placing the bicycle in the loading position, the first portion being narrower in width than the second portion, where the third track is disposed in the first portion of the third at least partially enclosed space, the third set of sides forming the third at least partially enclosed space on a second side of the at least partially enclosed space opposite the first side of the at least partially enclosed space. The access openings of the second and third at least partially enclosed spaces face in a first direction and the access opening of the at least partially enclosed space faces in a second direction opposite the first direction. Each of the at least partially enclosed spaces is in a form of a "T" when viewed from above. A first set of common sides separates the at least partially enclosed space from the second at least partially enclosed space, and a second set of common sides separates the at least partially enclosed space from the third at least partially enclosed space The bicycle storage assembly can further include a flexible cable connecting a movable element to the carriage. The movable element can include a lifting arm having at least one bar configured to inhibit removal of the bicycle from the support in the storage position. A frame is provided where the lifting arm is pivotally connected to the frame. At least a first portion of the cable extends upwardly from the movable element across the frame and down the track to the carriage, where movement of the movable element downward from the first position to the second position drives the carriage in an upward direction from the loading position to the storage position. A second portion of the cable or a second cable can extend downwardly from the movable element across the frame and up to the carriage, where movement of the movable element, upward from the second position to the first position drives the carriage downward from the storage position to the loading position.

A guide can extend vertically along the track where the first clamping member or plate is operatively coupled to the guide. The guide controls movement of the first clamping member or plate. If desired both of the first and second clamping member or plates are movable. The guide can include a first guide extending vertically along the track where the first clamping member or plate is operatively coupled to the first guide, the first guide controlling movement of the first plate; and a second guide extending vertically along the track where the second plate is operatively coupled to the second guide, the second guide controlling movement of the first clamping member or plate. The first and second guides are configured to forcibly drive the first and second clamping member or plates toward each other. If desired, the first and second guides can be configured to forcibly drive the first and second clamping member or plates away from each other.

A drive system can be coupled to the carriage and/or the movable member. The drive system includes rotating shafts coupled to cable drums, flexible members or gears. A power source such as springs, actuators, and/or motors (e.g. electric, pneumatic and/or hydraulic) or the like can be operatively coupled to the carriage or movable member, or rotating shafts, cables, flexible members or gears that are coupled to the carriage or movable member to lift or aid in lifting the carriage or movable member.

DETAILED DESCRIPTION OF ILLUSTRATIVE EMBODIMENTS

Figure 1:
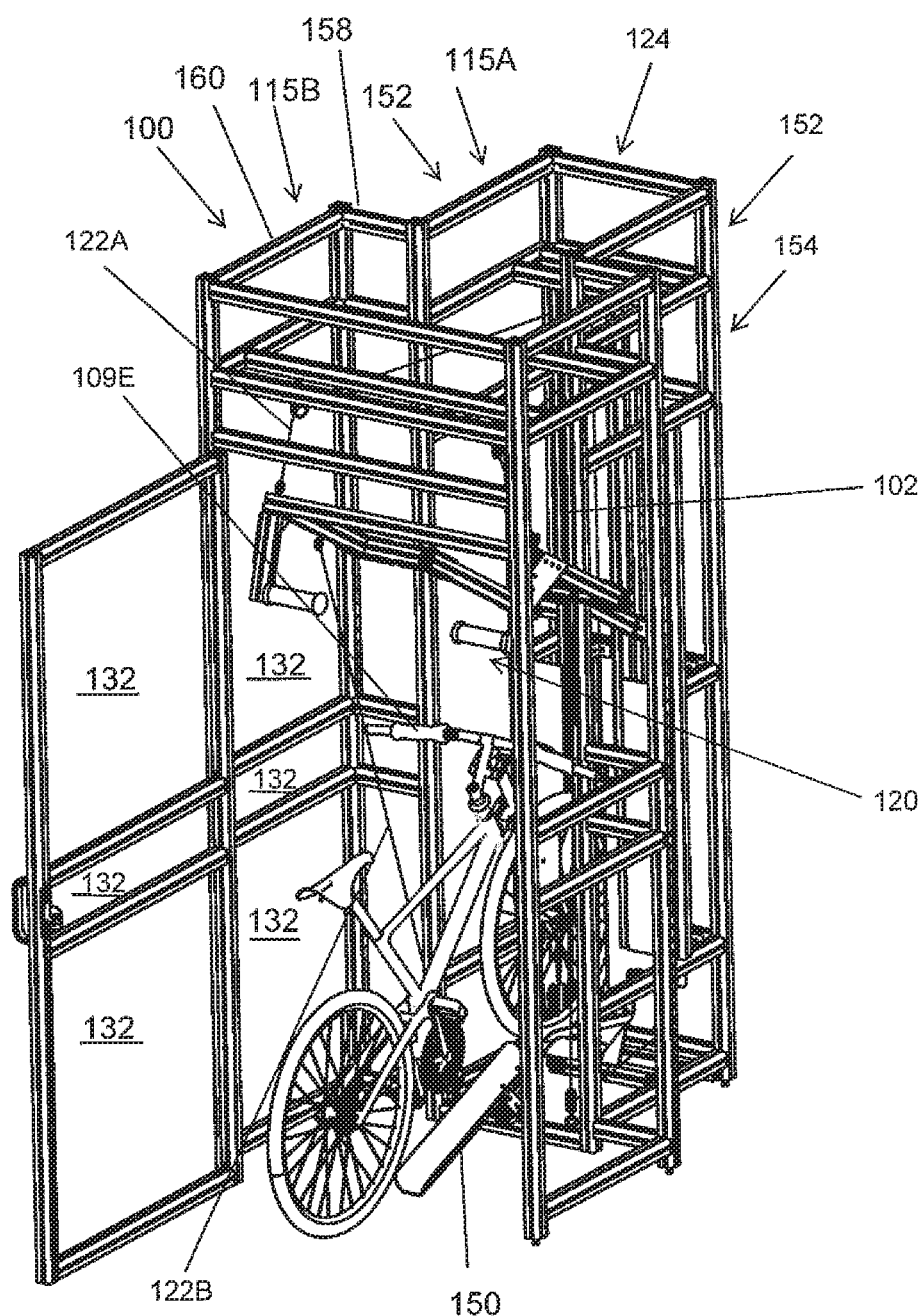
FIG. 1 is a perspective view of a bicycle storage assembly with a bicycle in a loading position.
Figure 2:
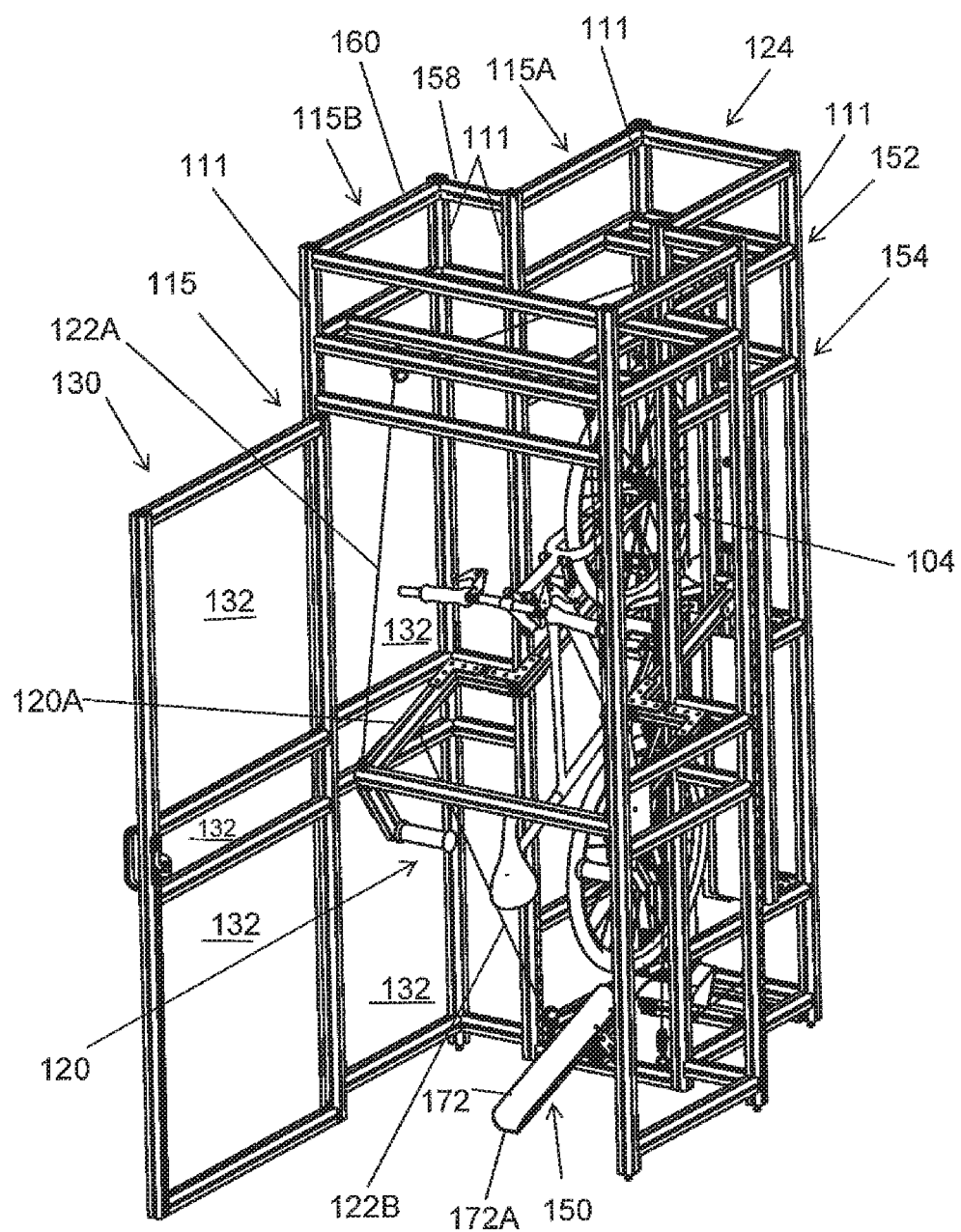
FIG. 2 is a perspective view of the bicycle storage assembly with the bicycle in a storage position.
Figure 3:
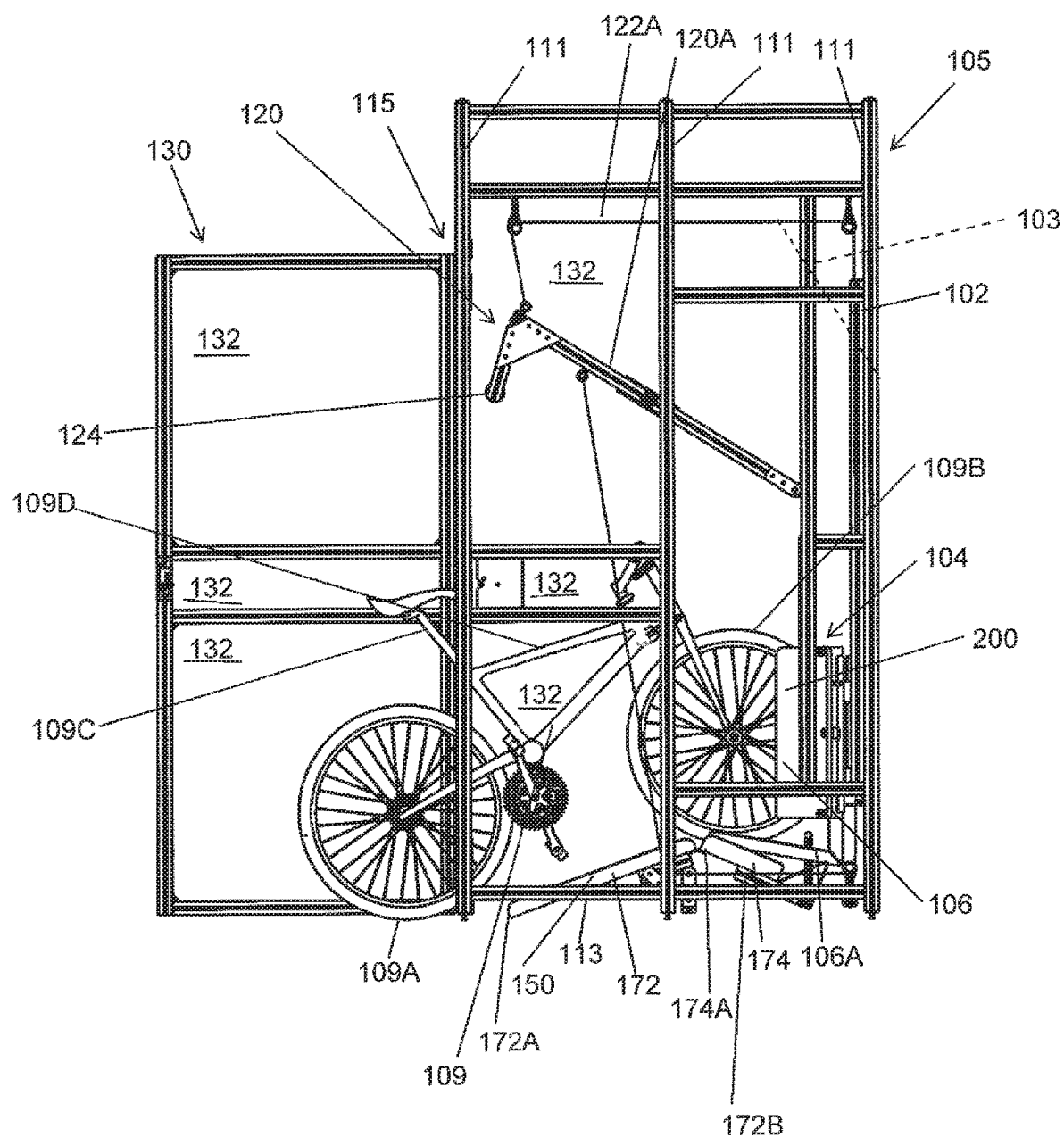
FIG. 3 is a side elevational view of the bicycle storage assembly of FIG. 1.
Figure 4:
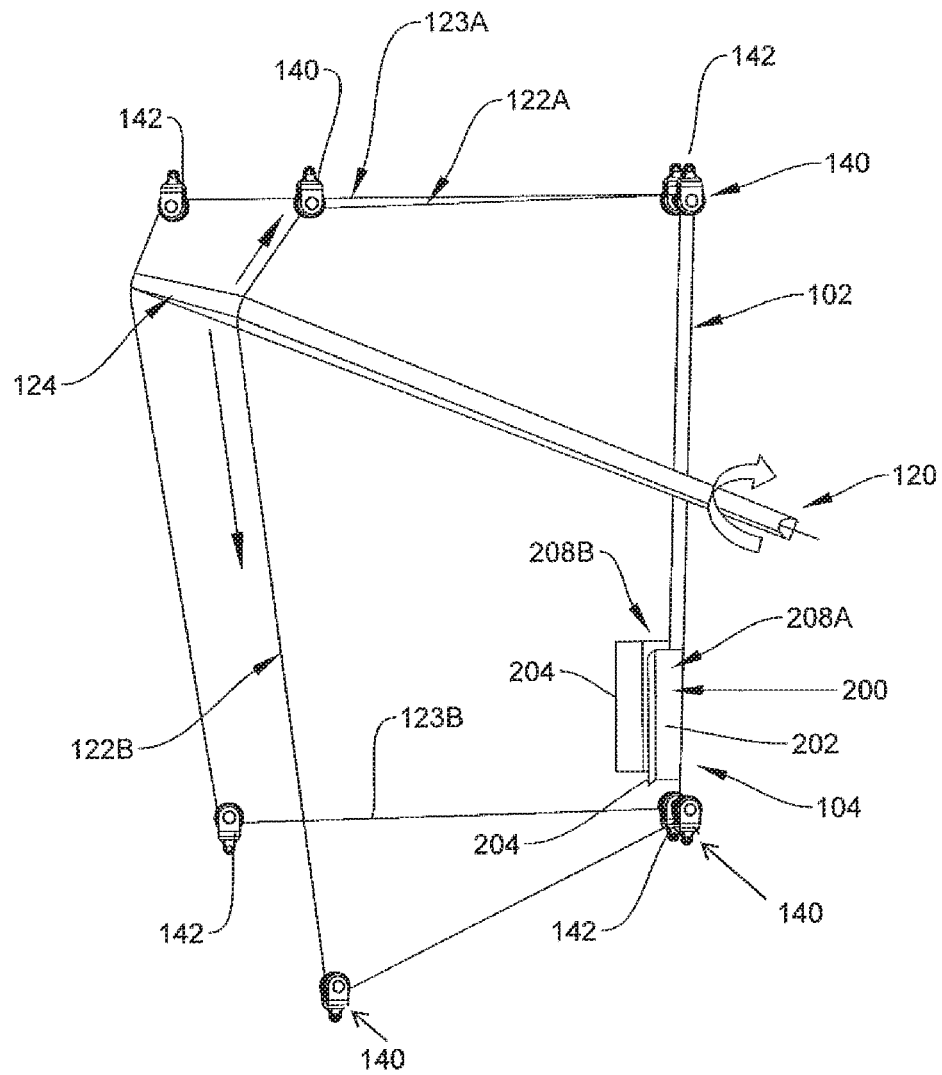
FIG. 4 is a schematic illustration of the bicycle storage assembly of FIG. 1.
Figure 5:
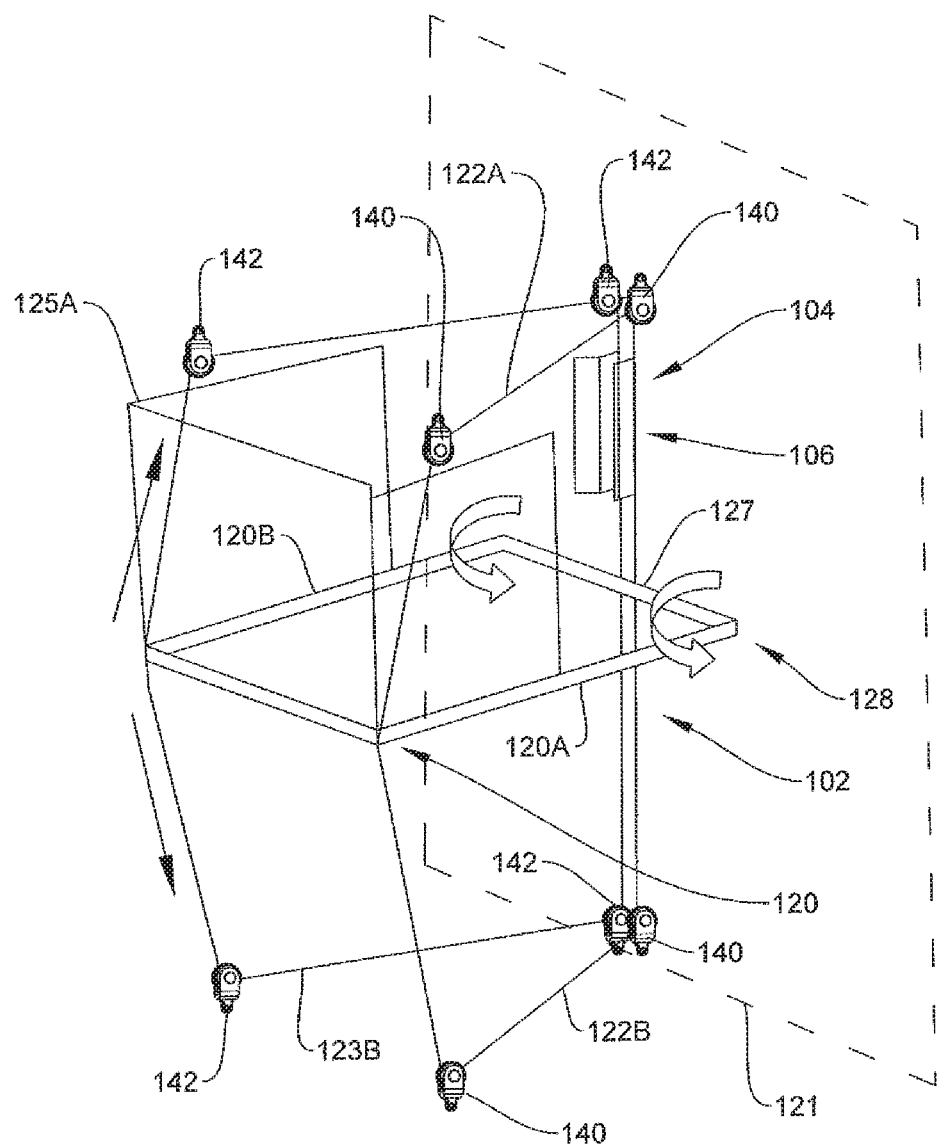
FIG. 5 is a schematic illustration of the bicycle storage assembly of FIG. 2.

FIGS. 1-3 are illustrations for a first embodiment of a bicycle storage assembly 100, while FIGS. 4 and 5 illustrate schematically some features of the bicycle storage assembly 100. Referring first to FIGS. 1-3, the bicycle storage assembly 100 includes a vertically oriented track 102. In the embodiment illustrated, the track 102 is substantially straight or linear however, this should not be considered limiting in that tracks, vertically oriented but having a curve such as illustrated in FIG. 3 at 103 could also be used. A carriage 104 is movable on the vertical track 102. The carriage 104 includes a support 106 configured to hold a tire and wheel assembly (either the front tire and wheel assembly or the rear tire and wheel assembly) of a bicycle 109.

A frame 105 supports the track 102 in a vertical orientation. The frame 105 is not illustrated in FIGS. 4 and 5; however, in FIGS. 1-3 the frame 105 comprises a number of vertical supports such as indicated at 111 interconnected with horizontal supports such as indicated at 113 so as to form an at least partially enclosed space also referred herein as an enclosure 115. However, this enclosure 115 should not be considered limiting in that the frame 105 could simply comprise an element such as simple support connected to the track 102 to hold it in an upright or vertical orientation. For instance, the support can comprise one or more elements to form a base so as to provide stability, the track 102 being connected to the base. In the embodiment illustrated in FIGS. 1-3, the base comprises horizontally oriented frame members 113 connected together and to the vertical frame members 111. In another embodiment, a portion of the track 102 is considered part of the frame and is mounted to a support surface such as a wall schematically illustrated with dashed line 121 in FIG. 5.

A movable element 120 is movable relative to the track 102 and/or to components, e.g. 111, 113 of the frame 105 which are stationary. The movable element 120 is connected to the carriage 104 with a least one cable 122A. The movable element 120 is movable from a first, lower position allowing a bicycle 109, e.g. a front or rear wheel assembly, to be disposed onto support 106 (FIGS. 1, 3 and 4) to a second or upper position where the carriage 104, support 106 and bicycle 109 are lifted to a vertical storage position with one wheel 109A of the bicycle 109, herein exemplified as the rear wheel, is positioned below a second wheel 109B of the bicycle 109, herein exemplified as the front wheel, which is held by support 106.

Referring to the schematic illustration of FIGS. 4 and 5, the movable element 120 includes spaced apart, pivotable supports 120A, 120B that pivot relate to the frame or track 102. If desired, the supports 120A, 120B can be interconnected with an axle 127 which rotates with pivoting movement of the supports 120A, 120B. However, this should not be considered limiting, in that the supports 120A, 120B can be pivotally connected to frame at separate locations.

As illustrated in FIG. 2, with the support 106 in the second position, the movable element 120 is preferably configured to inhibit removal of the bicycle 109, in particular, the bicycle wheel 109B from the support 106. In the embodiment of FIGS. 1-5, the movable element 120 comprises a lifting arm that includes a bar 124 which is oriented, for example, generally horizontally so as to form an obstruction for removal of the bicycle 109 from the assembly 100 when the bicycle 109 is vertically oriented in the storage position. Referring to FIG. 2, the bar 124 would inhibit lifting the bicycle 109 any substantial distance upwardly because the bar 124 would contact the seat post 109C of the bicycle 109. The bar 124 would also inhibit removing the bicycle 109 while it is oriented vertically, because the bar 124 would contact other portions, for example, frame portion 109D of the frame of the bicycle 109 if the bicycle 109 is pulled horizontally away from the support 106. It should be noted that, in other embodiments, additional bars or other obstructions can be provided on the arm 120 spaced apart from bar 124 so as to further inhibit removal of the bicycle 109, for example, from being twisted or rotated while it is being removed. For instance, the bar 124 and other bars forming part of arm 120 can comprise at least a partial cage 125A (schematically illustrated in FIG. 5) that is lowered around the bicycle 109 as the arm 120 is pulled down and the bicycle 109 is lifted upwardly. Generally, the bars or other obstructions, like bar 124, would be oriented to contact some portion of the bicycle 109 preventing its removal from the support 106 by contact with the wheels, frame, handle bars, etc. of the bicycle. Also, if desired, the frame 103 can include stationary bars 111, 113 or the like disposed so as to further obstruct removal of the bicycle 109 from the assembly 100.

In the embodiment of FIGS. 1-3, the storage assembly 100 comprises enclosure 115 having a door 130 and side structures (such as but not limited to panels, bar assemblies, fencing material) 132 (illustrated by way of example on door 130 and the left side of enclosure 115, but would be present anywhere on the enclosure 115 as desired), which when the door 130 is closed, also inhibits removal of the bicycle 109 from the support 106. If also desired, the enclosure 115 can also include a rear structure elements and/or a top structural elements (not shown in the embodiment of FIG. 1-3). The enclosure 115 thus by itself can inhibit removal of the bicycle 109 from the support 106. Nevertheless, it should be understood that the enclosure 115 with the various top and side structures 132 is, in one embodiment, optional.

FIGS. 1-3 also illustrate advantageous features of the enclosure 115 in that the enclosure 115 can includes a first enclosed rear portion 115A comprising a rear portion of the enclosed space which is narrower than a second enclosed front portion 115B comprising a front portion of the enclosed space, where the rear portion 115A and the front portion 115B are generally in the shape of a "T" as viewed from above. The rear portion 115A includes the track 102 and has side structures 152 extending forwardly from the rear structure 124. The front portion 115B, being wider than the rear portion 115A, has a lateral extent so as to accommodate typically at least the width of the handle bars 109E and an overall depth allowing the bicycle 109 to be completely located in the enclosure 115 when the door 130 is closed. Stated another way, the rear portion 115A of the enclosure 115 comprises the rear structure 154 and the two extending side structures 152, while the front portion 115B of the enclosure 115 includes the door 130 and any other structures such as illustrated at 158, 160 which generally define the boundary of the front portion 115B. The front portion 115B also includes side structures 160 extending from the front toward the rear portion with a depth sufficient to accommodate portions of the bicycle 109 such as the handle bars 109E, seat post 109C and frame 109D components connecting the handle bars 109E and seat post 109C together.

Figure 6:
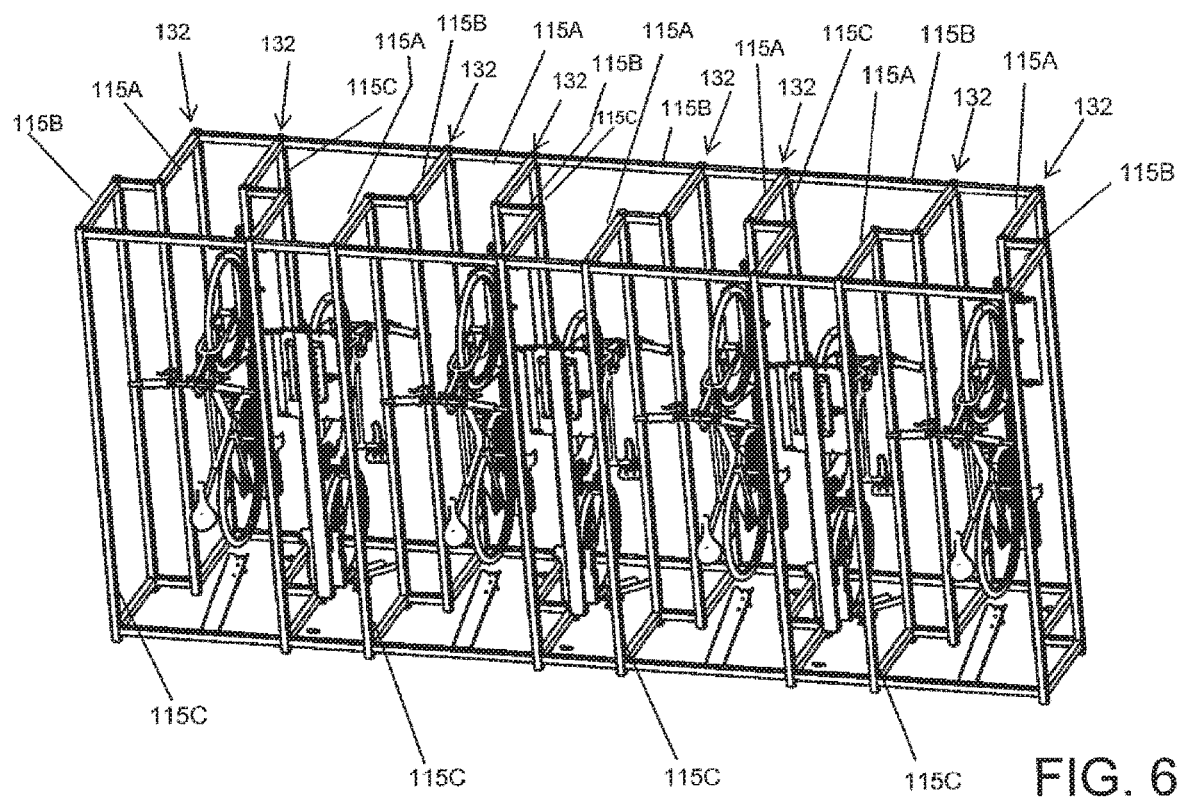
FIG. 6 is a bicycle storage assembly having nested at least partial enclosures.
Figure 7:
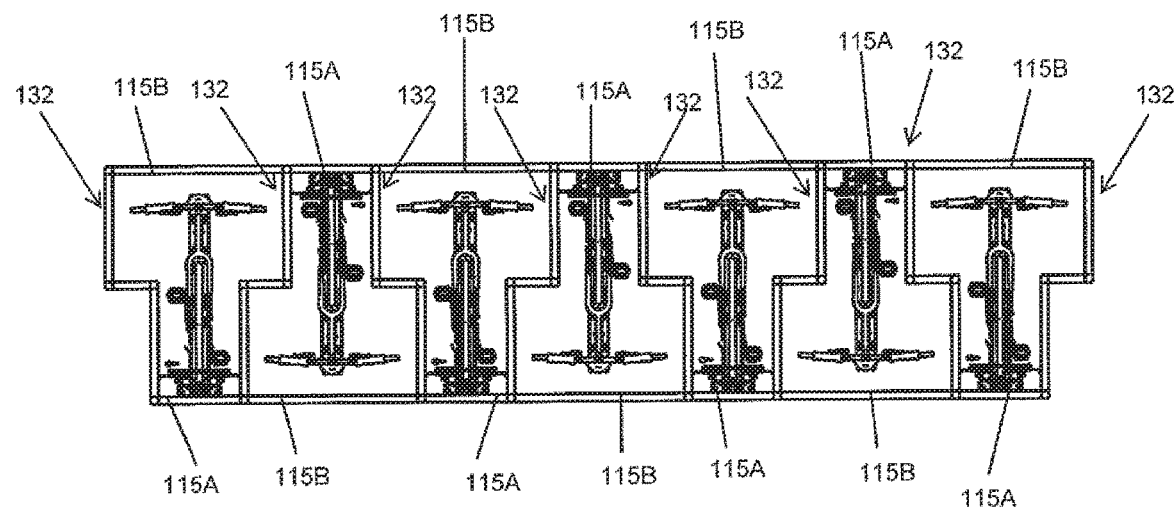
FIG. 7 is a top view of the bicycle storage assembly of FIG. 6.

At this point it should be noted that in a preferred embodiment a width of the rear portion 115A is selected so as to accommodate, the width of the pedal crank assembly. In other words, the width of the rear portion 115A is sufficient such that both pedals can be located therein, i.e. from a remote end of a left hand pedal to a remote end of a right hand pedal. Similarly, a depth of the rear portion 115A is of length to such that both pedals can be located therein. It has been found that the dimensions of pedal crank assemblies are generally the same across different sizes and types of bicycles. When the storage assembly side structures 132 are constructed in this manner to have a "T" shape when viewed from above, side by side enclosures 115 can be located next to each other where the access openings 115C for loading the bicycles 109 (through optional doors 130) of the enclosures 115 face or open in alternating directions, from enclosure to adjacent enclosure. This nesting structure is illustrated in FIGS. 6 and 7 (where parts have been removed to enhance understanding). Stated another way, the enclosures 115, when viewed from above, nest with each other where wider front portions 115B of enclosures 115 on opposite sides of any given enclosure 115, nest within the recesses formed between the front or access portion 115B and the narrower rear portion 115A having lift elements, i.e. the track 102 and carriage 104, of the associated enclosure. Since the bicycles 109 stored therein are also stored in a vertical manner, the footprint of the nested enclosures 115 is minimized thus saving space and increasing the storage density of the assembly as a whole. It has been found that a depth of the rear portion 115A should approximately equal the depth of the front portion 115B, while a width of the rear portion 115A should approximately equal one half of a width of the front portion 115B. In one embodiment, the width of the rear portion 115A is less than 22 inches, while in a further preferred embodiment the width of the rear portion 115A is 18 inches or slightly less, the remaining cross-sectional dimensions of the front portions 115B having the dimensional relationship as discussed above. In the embodiment of FIGS. 6 and 7, side structures 132 disposed between adjacent enclosures 115 are used for defining the boundaries of both adjacent enclosures 115. Hence, this construction minimizes structural components necessary to for nested storage assemblies. However, this should not be considered limiting in that if desired separate side structures 132 can be provided for each enclosure 155 even when nested in a manner similar to that illustrated in FIGS. 6 and 7.

Referring back to FIGS. 4 and 5, as indicated above, a lifting device preferably having at least one cable 122A is provided so as to lift the carriage 104, support 106 and bicycle 109, when the movable element (e.g. lifting arm) 120 is moved from the first position illustrated in FIG. 4 to the second position illustrated in FIG. 5. A first end of the cable 122A is connected to the carriage 104 and extends over one or more pulleys 140 and is connected to arm 120. In a further embodiment, if desired, a second cable 122B can be connected to the arm 120 at one end and the carriage 104 at the other end, engaging one or more lower pulleys 142 so as to extend along track 102 and be connected to carriage 104 from below. Connected as such the cables 122A, 122B and portions of the arm 120 and the carriage 104 in effect form a loop such that when the arm 120 is pushed downwardly, the carriage 104 is pulled upwardly on the track 102 by cable 122A, while when the arm 120 is lifted, the carriage 104 is pulled downwardly on the track 102 by cable 122B, rather than simply relying on the weight of the bicycle 109 and/or carriage 104 to lower the bicycle 109 and carriage 104. It should be noted that separate cables 122A, 122B can be used or a single cable with operative portions 122A, 122B can be used.

In the illustrated embodiment, a second set of upper and lower cables 123A, 123B is connected to arm 120 and to carriage 104, being guided around pulley(s) 140, 142. As will be explained below, the support 106 can include clamping members to clamp upon side surfaces of the tire of the bicycle 109. The clamping members can be driven between open and closed positions. Pulling the carriage 104 downwardly through the cables 122B and/or 123B may aid in opening the clamping members.

In FIGS. 1-3, the bicycle storage assembly 100 can includes an optional ramp 150 that can be advantageous in that the ramp 150 lifts the front or rear wheel upwardly when the bicycle 109 is pushed onto the support 106, which herein includes a tray 106A. In one embodiment, the ramp 150 can comprise two portions: a stationary portion 172 and a movable portion 174. The stationary portion 172 has a first end 172A that rests upon, or is in close proximity to the ground surface and a second elevated end 172B. The movable portion 174 has a first end 174A in close proximity to the second end 172B of the stationary portion 172 and, if desired, can be connected thereto with a hinge or the like. The movable portion 174 can extend upwardly at the same angle as the stationary portion 172 if desired (when a bicycle is not placed thereon), or it can have a different angle of inclination. A spring is connected to the movable portion 174. The spring 176 biases the movable portion 174 upwardly. For example, the spring can be a torsion spring operably connected to the ends 172B and 174A. When the bicycle wheel assembly is brought toward the support 106, the stationary portion 172 aids in guiding the bicycle wheel assembly to the proper positon for loading the bicycle 109 on the support 106. When the wheel assembly of the bicycle is in the proper position, the movable portion 174 can move (downwardly) so as to provide a positive, tactile indication that the bicycle 109 is in the proper loading position. As the bicycle 109 is lifted by the support 106, the movable portion 174 can return to its biased upward state due to the spring. It should also be noted that in one embodiment, the ramp 150 can also be used to support the lower tire and wheel assembly of the bicycle 109 when the bicycle 109 is in the storage position. In particular, the travel of the support 106 upwardly to the storage position can be a distance such that the lower tire and wheel assembly of the bicycle 109 is not positioned directly below the upper tire and wheel assembly, but rather, is supported by the ramp 150 such that a reference line extending between the upper axle and the lower axle is not parallel with the track 102, but rather has an angle that is oblique with respect to the track 102. With the lower bicycle tire and wheel assembly on the ramp 150 and the bicycle 109 oriented with the oblique angle with respect to the track 102, the bicycle's center of gravity is offset from a pure vertical orientation which can make unloading of the bicycle easier, particularly, since the lower tire and wheel assembly will be guided upon the ramp 150 out of the enclosure 115 as it is lowered.

In one embodiment, the support 106 used to engage and hold the bicycle 109 in the storage position includes a pair of clamping plates 200 that are oriented so as to frictionally engage the tire and wheel assembly placed in or on the support 106, and in a further embodiment, primarily just side walls of the tire rather than other components of the wheel assembly such as the rim or spokes. As illustrated in the schematic FIGS. 4 and 5, each of the clamping plates 200A, 200B has a vertical length and a horizontal width so as to frictionally engage the side walls of the tire in view of the fact that these tire surfaces are disposed in an arc extending outwardly from the carriage 104 when the tire and wheel assembly is in the support. In many prior art designs, it has been advanced to use elements that curve around the tire and the rim thereby have ends which can come into contact with and possibly damage the rim and/or the spokes of the tire and wheel assembly. In contrast, the clamping plates 200A, 200B are configured so as to preferably engage only, or at least substantially only, the side walls of the tire rather than have portions configured to curve around the tire and rim and toward each other from opposite sides of the tire and wheel assembly, which again can cause damage to the rim, spokes or other portions of the tire and wheel assembly. Stated another way, the support 106 (in particular the clamping plates 200A, 200B) is devoid of any element that extends through spaces between spokes of the tire and wheel assembly or, in a further embodiment, even over circumferential inwardly surface of the rim.

In a preferred embodiment, each clamping plate 200A, 200B can include an extending portion 204 that extends in a direction away from the other clamping plate at an oblique angle with the associated portion 202A, 202B of the clamping plate 200A, 200B that frictionally engages the side wall of the tires. The extending portions 204 of the clamping plates 200A, 200B provide a wider opening that can help guide the tire and wheel assembly into a proper position on the support 106 and between the portions 202A, 202B of the clamping plates 200A, 200B that will frictionally engage the tire.

Figure 8:
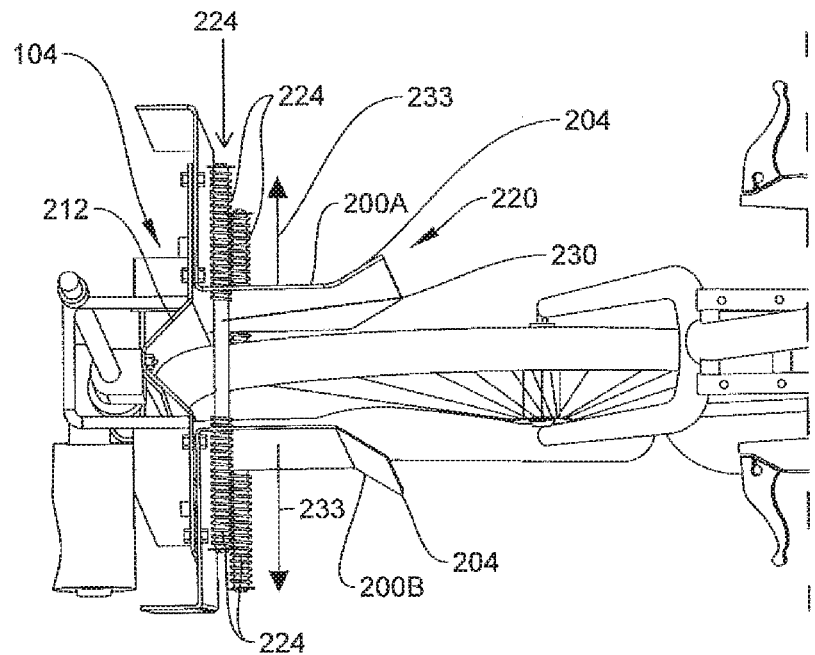
FIG. 8 is a top view of a clamping assembly.
Figure 9:
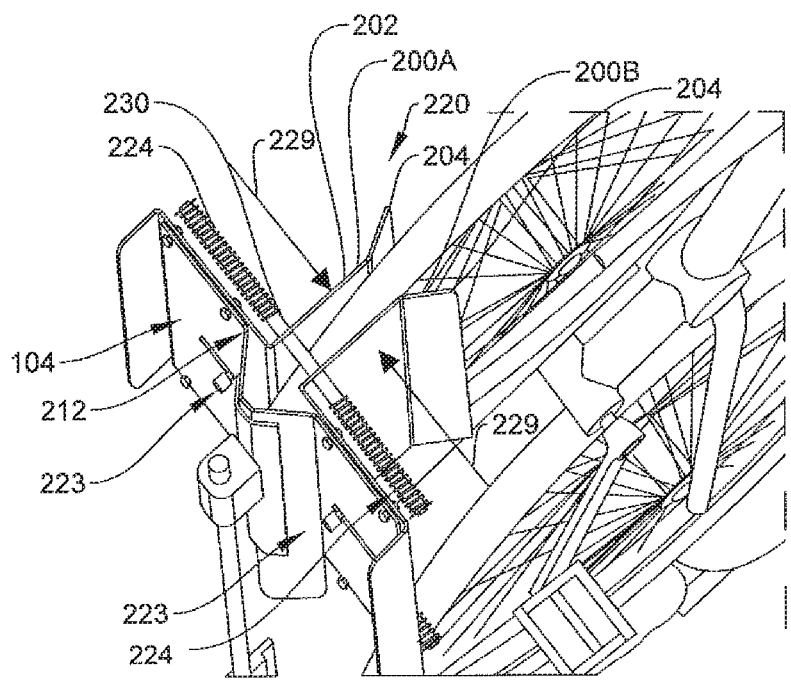
FIG. 9 is a perspective view of the clamping assembly of FIG. 8.
Figure 10:
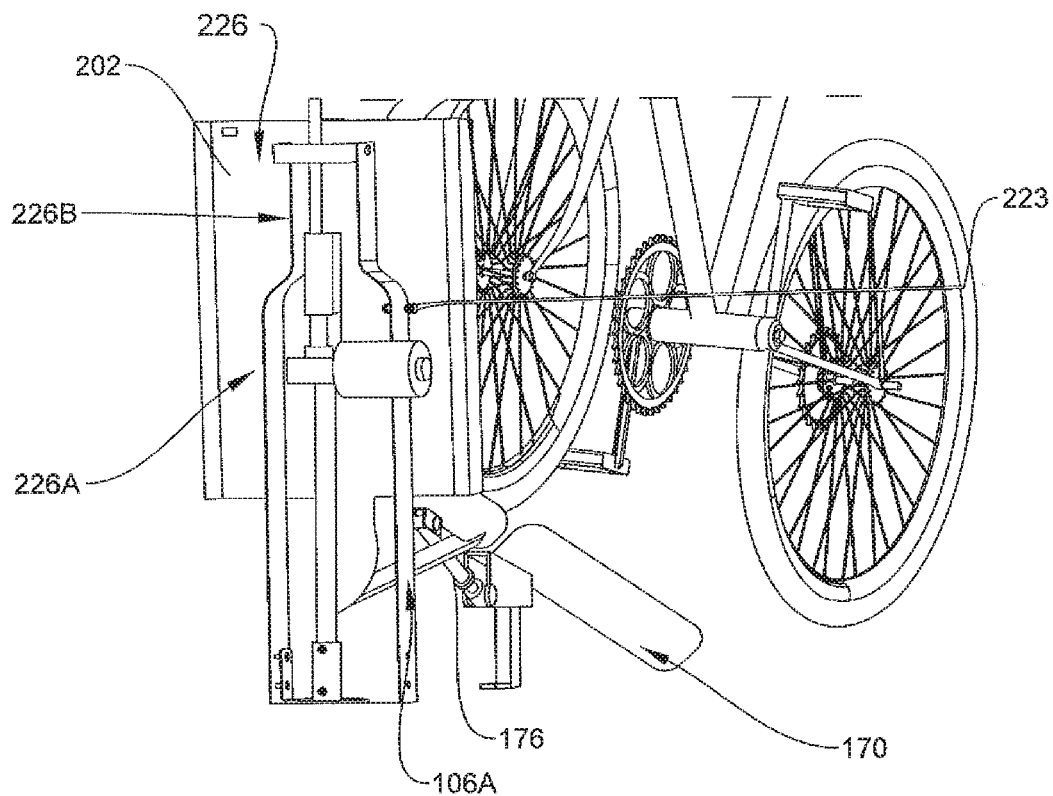
FIG. 10 is a rear perspective view of the clamping assembly of FIG. 8.

A first embodiment of a clamping plate assembly is illustrated in FIGS. 8-10 comprising part of the support 106 is indicate at 220. The clamping plate assembly includes a support plate 212 and at least one clamping plate 200A movably secured to the support plate 212. Generally, in this embodiment and the other embodiments discussed below a drive assembly is provided for each clamping plate 202A, 202B that is movable. In the embodiment illustrated, two moveable clamping plates 200A, 200B are illustrated; however, in another embodiment, the support plate 212 can have an extending plate to function as one of the clamping plates. From this point on embodiments having two sliding clamping plates will be described; however, this should not be considered limiting.

The clamping plates 200A, 200B slide on and/or move relative to the support plate 212 where suitable aperture(s) such as slots are provided for fasteners that connect each clamping plate 200A, 200B to the support plate 212. In one embodiment, each movable clamping plate 200A, 200B is preferably biased toward the other clamping plate 200A, 200B (as indicated by arrows 229 in FIG. 9) by springs 224 such that the springs 224 exert a force upon the movable clamping plate 200A, 200B to provide a sufficient clamping force between the clamping plates 200A, 200B so that portions 202A, 202B frictionally engage the side walls of the tires. The track 102 can includes a vertically oriented guide member 226, a portion of which is illustrated in FIG. 10, which controls movement of the movable clamping plates 200A, 200B upon the support plate 202. In the embodiment illustrated, a projection 223 is secured to each movable clamping plate 200A, 200B on a side of the support plate 202 adjacent the guide member 226 and is of length so as to make contact with the vertically oriented guide member 226. In a preferred embodiment, an end of the projection 223 includes a roller that rolls upon the vertically oriented guide member 226 and functions as a cam follower. In a lower portion of the track coinciding with the loading position, the vertically oriented guide member 226 includes a portion 226A that has spaced apart guide surfaces further away from a center line of the track 102. Portion 226A drives each of the projections 223 away from the center line of the track 102 as indicated by arrows 233 in FIG. 8. A remainder portion 226B of the vertically oriented guide member 226 is positioned closer to the center line of the track 102, particularly in the position of the support 106 on the track 102 at which the bicycle is lifted upwardly and finally to the storage position. When the projections 223 are in contact with portion 226B, the bias in the springs 224 drives the clamping plates 220A, 220B toward each other to frictionally engage the tire.

It should be noted in the embodiment where both clamping plates 200A, 200B move, a support rod 230 can extend between the clamping plates 200A, 200B and outwardly therefrom to hold the springs 224 in position. Although illustrated where the springs 224 are compression springs, it should be understood that other forms of springs such as springs that operate in tension, include hinged portions or are, formed in a spiral, can also be used as appreciated by those skilled in the art.

Figure 23:
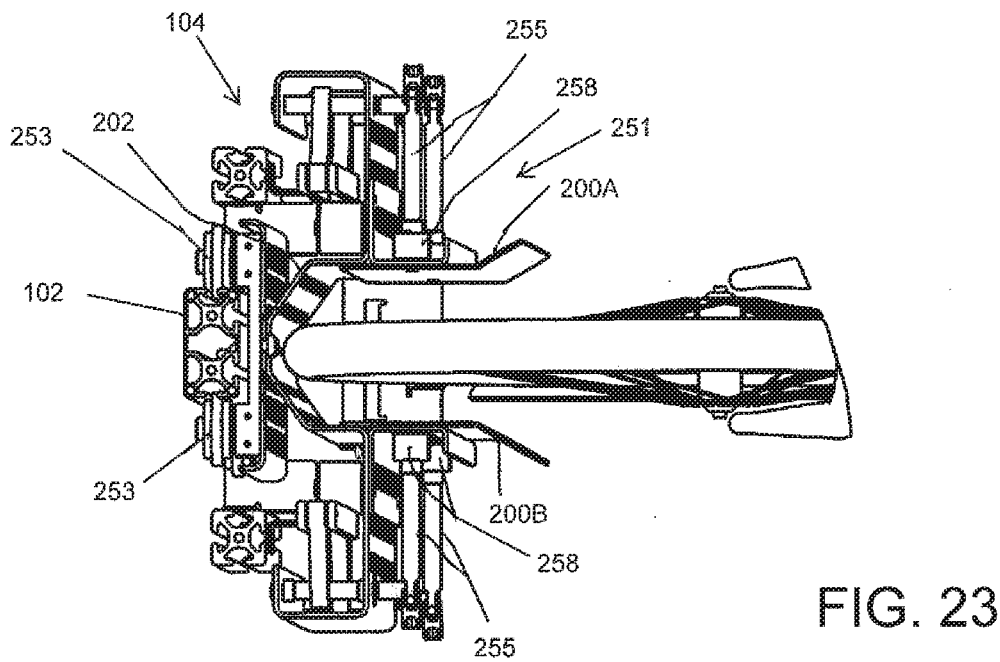
FIG. 23 is a top view of another clamping assembly.
Figure 24:
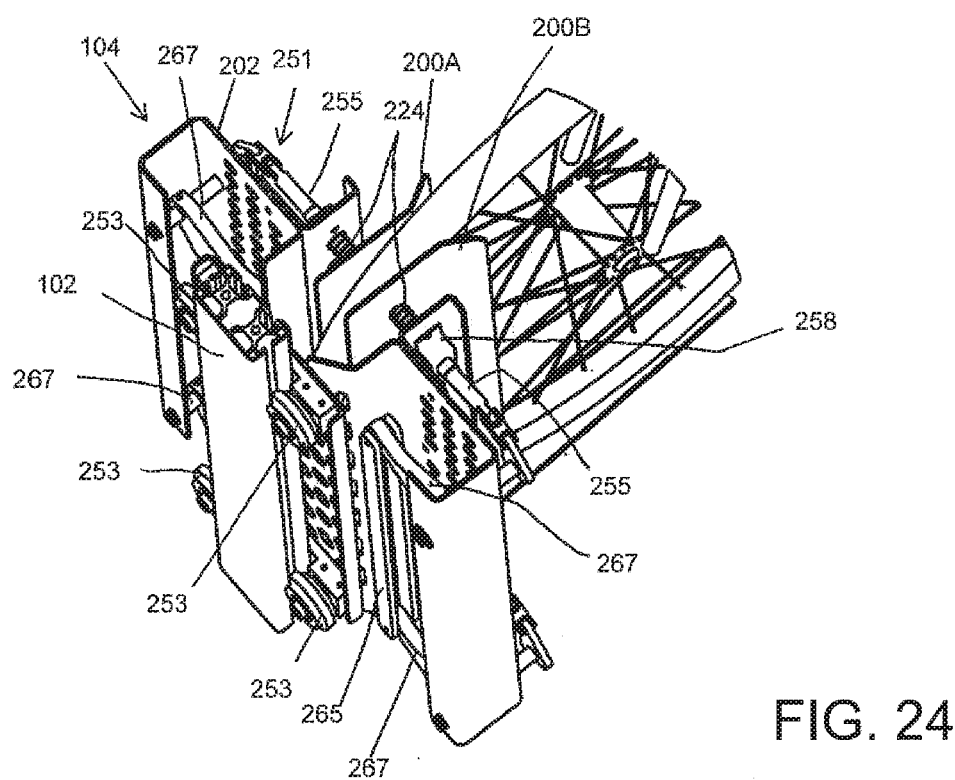
FIG. 24 is a top perspective view of the clamping assembly of FIG. 23.
Figure 25:
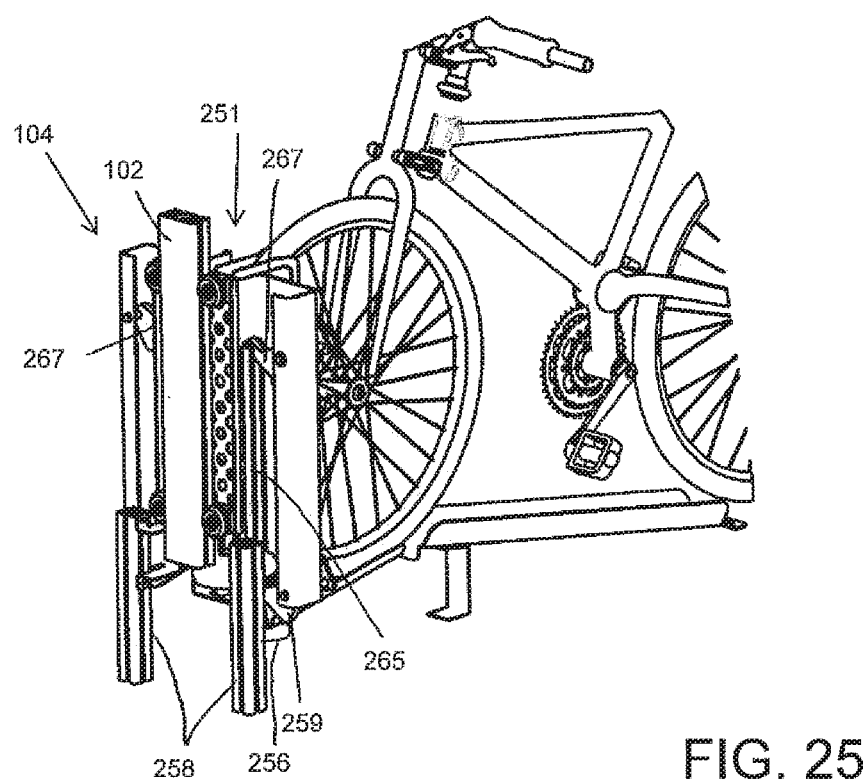
FIG. 25 is a rear perspective view of the clamping assembly of FIG. 23.

A second embodiment of a clamping plate assembly is illustrated in FIGS. 23-25 at 251. As in the previous embodiment, the carriage 104 moves along a vertically oriented track 102. In this embodiment, the carriage 104 includes support plate 202 having guide rollers 253 that roll on sides of the track 102; however this should not be considered limiting. Clamping plates 200A, 200B as wells as the support plate 202 are again identified in view that these components are generally the same as the embodiment described above. Each movable clamping plate 200A, 200B is preferably biased toward the other clamping plate 200A, 200B by springs 224 such that the springs 224 exert a force upon the movable clamping plate 200A, 200B to provide a sufficient clamping force between the clamping plates 200A, 200B so that portions 202A, 202B frictionally engage the side walls of the tires. The clamping plates 200A, 200B move linearly by connected rods 255 extending through support plate 202. Each connecting rod 255 extends through an aperture in the support plate 202 and a spring 224. In FIG. 24, the springs 224 are illustrated, whereas in FIG. 23 with the plates 200A, 200B retracted, the springs 224 are compressed within a cavity in a receiver 258.

The connecting rods 255 for each clamping plate are driven by a cam 259 that pivots on and is carried by the support plate 202. When the carriage 104 is lowered on the track to the loading position, each cam 259 is driven by contact with a stationary stop 256 herein mounted to a support 263 positioned adjacent to track 102. The cam 259 is connected to a drive link 265. The drive link 265 is pivotally connected to arms 267 that pivot on the support plate 202. Each arm 267 is connected to one of the connecting rods 255.

Movement of the clamping plates 200A, 200B occurs as follows. When the carriage 104 is lowered, the cams 259 contact and are driven upwardly, pivoting on the support plate 202. The cams 259 in turn drive the drive link 265 upwardly, which in turn causes rotation of the arms 267. Rotation of the arms 267 pulls the connecting rods 255 and the clamping plates 200A, 200B attached thereto open, while compressing the springs 224. When the carriage 104 is lifted upwardly on track 102, the springs urge the clamping plates 200A, 200B against the tire, causing the connecting rods 255, arms 267, drive link 265 and cams 259 to move in the opposite directions. It should be noted in another embodiment, it may be possible to drive the drive link 265 directly with the stop 256 rather than through the cam 259.

A third embodiment of a clamping plate assembly is illustrated in FIGS. 11-16 at 250. Clamping plates 200A, 200B as wells as support plate 202 are again identified in view that these components are generally the same as the embodiment described above. Rather than using stored energy from springs to provide a clamping force, the clamping plate assembly 250 uses movable components in combination with a plurality of guide rails indicated at 252 (which also function as the track 102) where a first set 252A is provided for clamping plate 200A, and a second set 252B is provided for clamping plate 200B. One or more cam followers 254 are provided for each clamping plate 202A, 202B and cooperate with the guide rails of each set 252A, 252B to control movement of each clamping plate 200A, 200B.

Figures 11, 12:
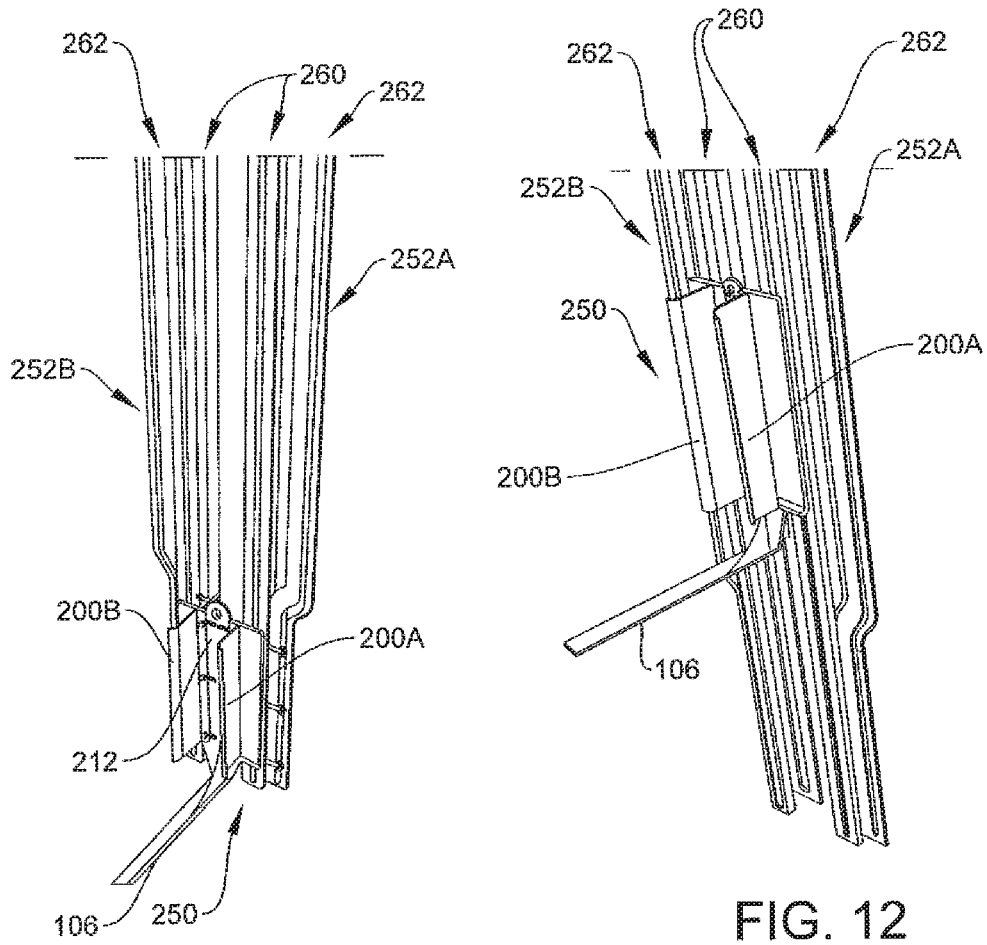
FIG. 11 is a perspective view of another claiming assembly in a loading position.
FIG. 12 is a perspective view of the clamping assembly of FIG. 11 in an elevated position.
Figure 13:
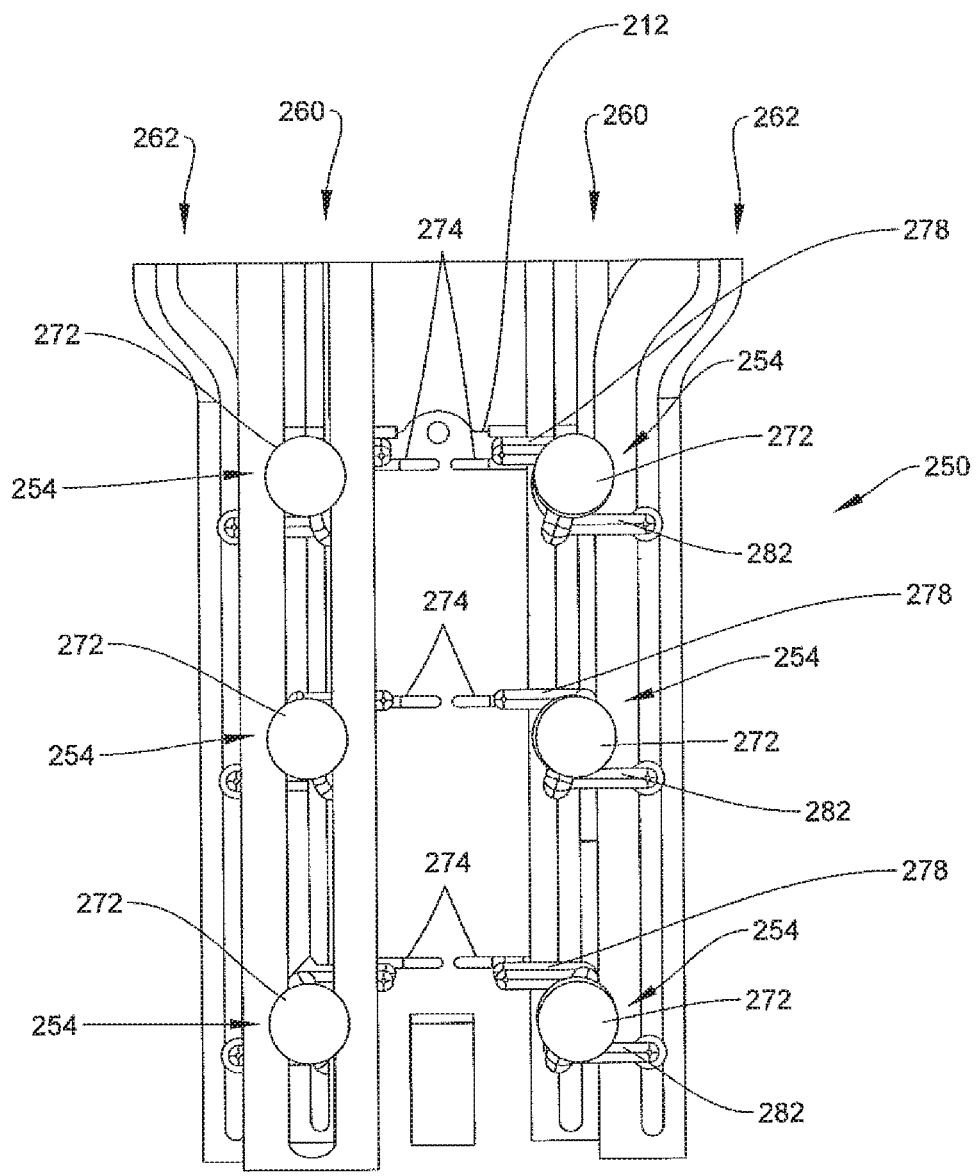
FIG. 13 is a rear view of the clamping assembly of FIGS. 11 and 12.
Figure 14:
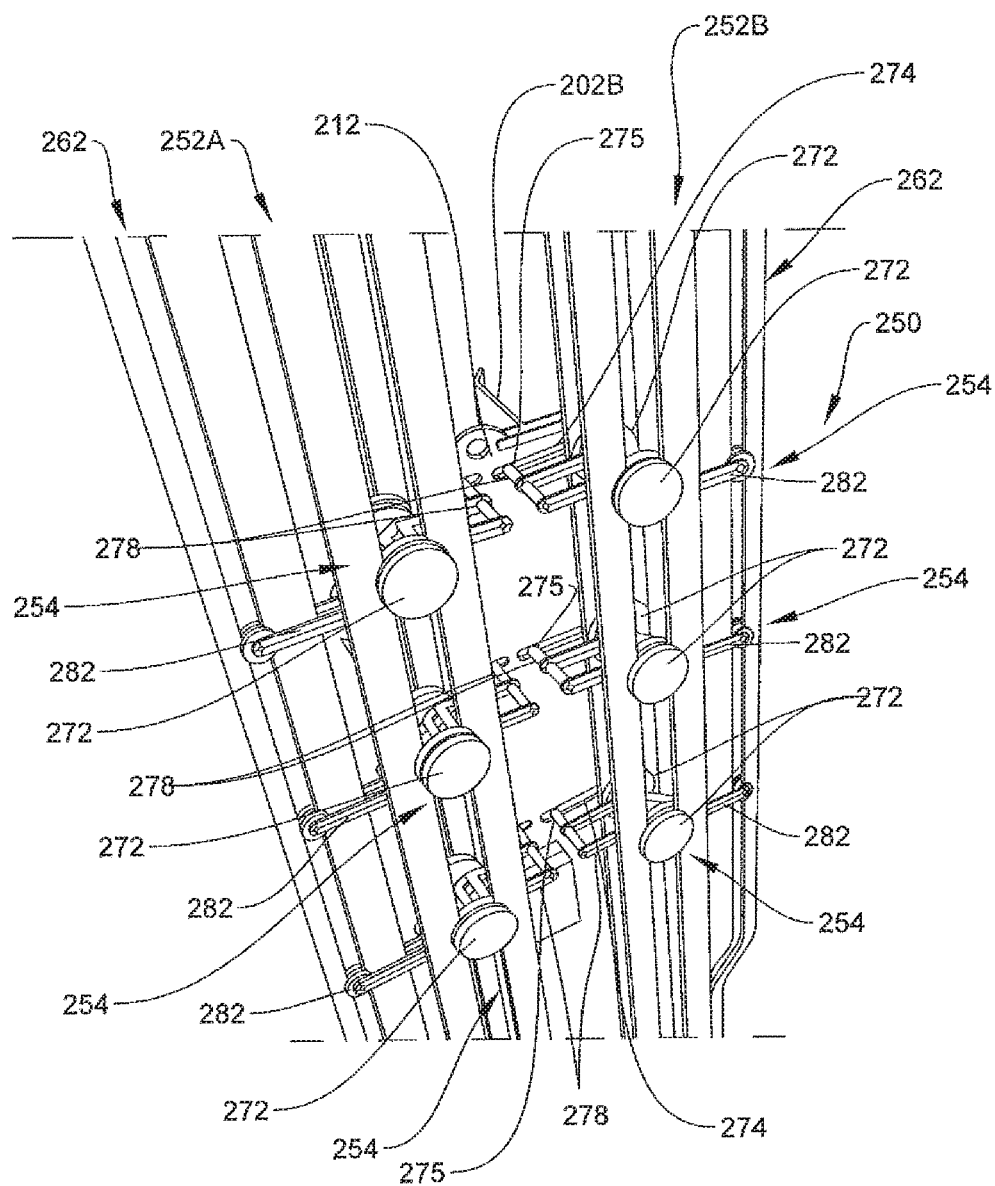
FIG. 14 is a rear perspective view of the clamping assembly of FIGS. 11 and 12.
Figure 15:
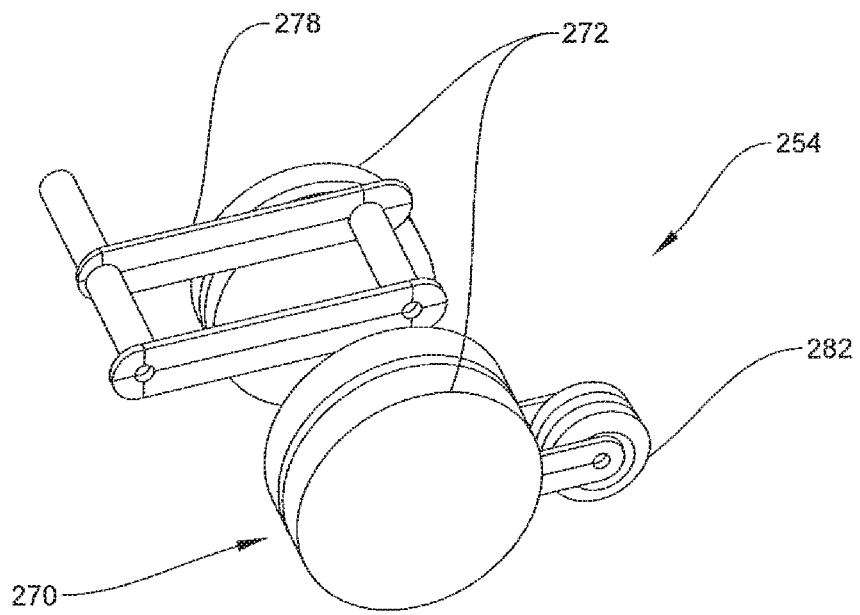
FIGS. 15 and 16 are perspective views of a cam mechanism or follower.
Figure 16:
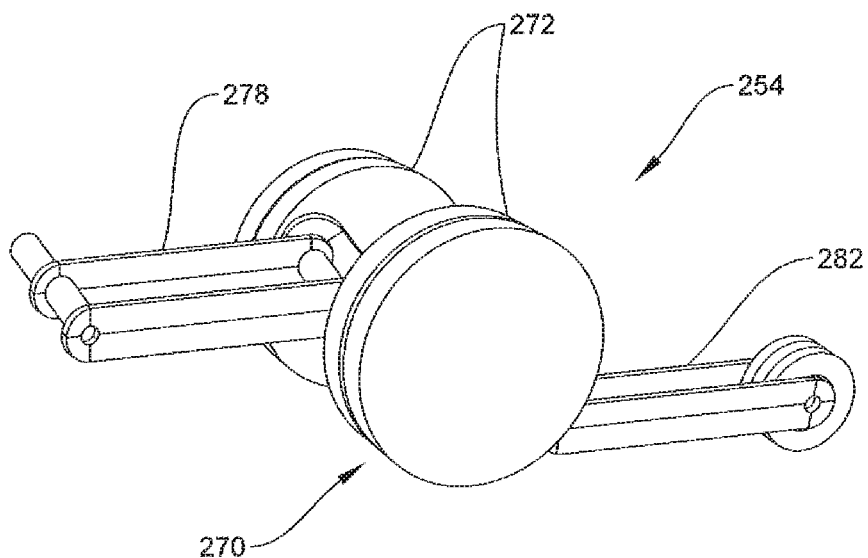

FIGS. 11 and 12 illustrate the clamping plates 200A, 200B in the loading position (FIG. 11) and in an elevated position (FIG. 12), which is equivalent to the position of the clamping plates 200A, 200B in the storage positon. Referring to FIG. 13, which corresponds to the loading position of the clamping plates 200A, 200B, each set of guide rails 252A, 252B includes at least one guide rail 260 that is substantially straight from top to bottom of the track 102 and a second guide rail 262 that has first portion 262A and a second portion 262B, each portion being offset from the guide rail 260 by a different amount. Each guide rail 260, 262 includes a slot extending along its length.

Each cam follower 254 comprises a crank assembly. The crank assembly includes a rotatable center section 270 guided in guide rail 260. In the embodiment illustrated, the rotatable center section 270 includes at least one guided element 272 that slides along the guide 260 but will also rotate about a movable axis transverse to the guide 260. A connecting arm 278 is connected to a projection 275 that extends through a slot 274 in the support plate 212. The projection 275 is secured to one of the clamping plates so as to drive the clamping plate.

The connecting arm 278 is connected to the guided element 272 at a position offset from the axis of rotation of the guided element 272 so as to create a lever arm. A cam follower arm 282 is also connected to the guided element 272 at a position offset from the axis of rotation of the guided element 272 so as to create a second lever arm. An end of the cam follower arm 282 remote from the guided element 272 is guided by guide rail 262. In the load position of FIG. 13, each cam follower arm 282 is contracted (See also FIG. 15) where the cam follower arm 282 has been pushed toward guide rail 260, which causes rotation of the guided elements 272 and hence movement of the connecting arm 278 toward guide rail 262, which in turn pulls a portion of the connected clamping plate away from the other clamping plate. As the clamping plates 200A, 200B are lifted upwardly, each cam follower 254 assumes an extended position (FIG. 16) where the cam follower arm 282 is pulled toward guide rail 262, which in turn again cause rotation of the guided element 272 so as to drive the connecting arm 278 away from guide rail 260 thereby generating a clamping force between the clamping plates 200A, 200B upon the tire.

In the embodiment illustrated, the guide rail 260 preferably includes two spaced apart guide rails, each having a slot extending along its length. The guided element 272 is provided for each of the guide rails 260 where an offset connecting pin extends between the guided elements 272 and is connected to the connecting arm 278. A similar offset connecting pin extending between the guided elements 272 is connected to the cam follower arm 282. The use of spaced apart guided elements 272 moving in spaced apart guide rails 260 provides a stable element as it moves up and down in the guide rails 260.

Figure 17:
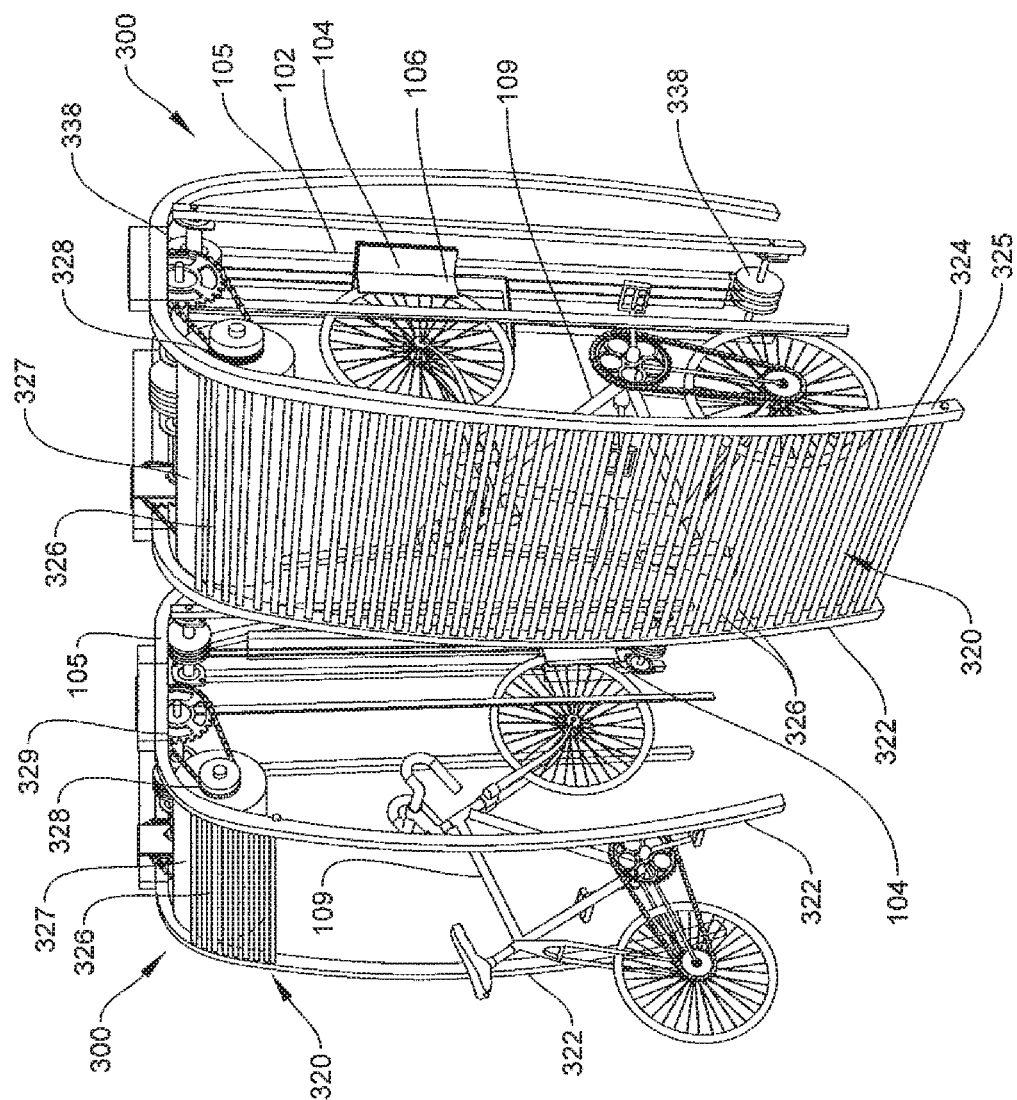
FIG. 17 is a perspective view of another bicycle storage assembly.
Figure 18:
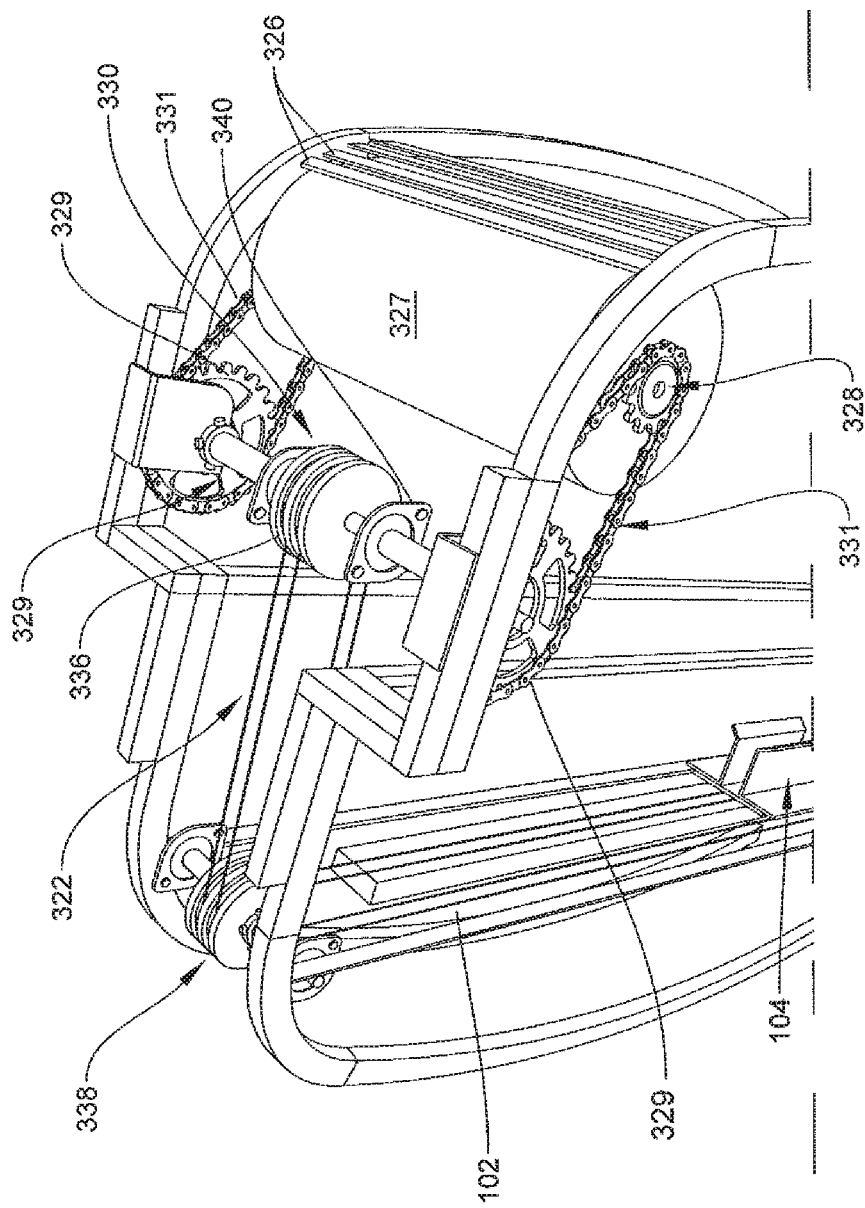
FIG. 18 is a perspective view of a portion of the bicycle storage assembly of FIG. 17 with parts removed.

Another embodiment of a bicycle storage assembly is illustrated at 300 in FIGS. 17 and 18. The bicycle storage assembly 300 also includes a movable element 320 that is movable relative to the track 102 and/or to components of the frame 105 which are stationary. The movable element 320 is connected to the carriage 104 with a least one cable 322. The movable element 320 is movable from a first, lower position allowing a bicycle 109, e.g. a front or rear wheel assembly, to be disposed onto support 106 (left hand assembly of FIG. 17) to a second or upper position where the carriage 104, support 106 and bicycle 109 are lifted to a vertical storage position. As with the movable element 120 described above, the movable element 320 inhibits removal of the bicycle 109 from the assembly 300 when the bicycle 109 is in the storage position.

In the assembly 300, the movable element 320 comprises a door assembly 324 that is guided on vertical members 325 of the frame 105. In this embodiment, the door assembly comprises a door 324 that can be rolled up, the door 324 comprising a plurality of horizontal members 326 or other structures such as flexible fence or the like that is rolled up. If desired, the rolled up door 324 can be guided into a storage container 327. When the door 324 is rolled up, this action causes rotation of an axle (not shown) that has at least one drive member (e.g. gear) 328 on an end thereof. The gear 328 is coupled to a drive member 329 (e.g. gear) of a cable assembly 330 with a flexible member (e.g. chain) 331. The cable assembly 330 includes a rotatable cable drum 336 that is connected via the cables 322 to carriage 104. Additional cable drums or pulleys 338 can be used to guide the cables 322 along a path parallel to track 102.

When the door 324 is rolled up the carriage 104 is lifted up along the track 102. In a particular advantageous embodiment, a ratio is provided between the drive members 328 and 329 so as to account for the different lengths of travel of the door 324 as it is rolled and unrolled and the extent of travel of the carriage 104 on the track 102.

In a further embodiment, to aid in the lifting of the bicycle 109 as the door is pulled down, a torsion spring 340 having stored energy can be unwound to provide a lifting force upon the carriage 104. When the door is wound up, the torsion spring 340 can be wound to store energy therein.

Figure 19:
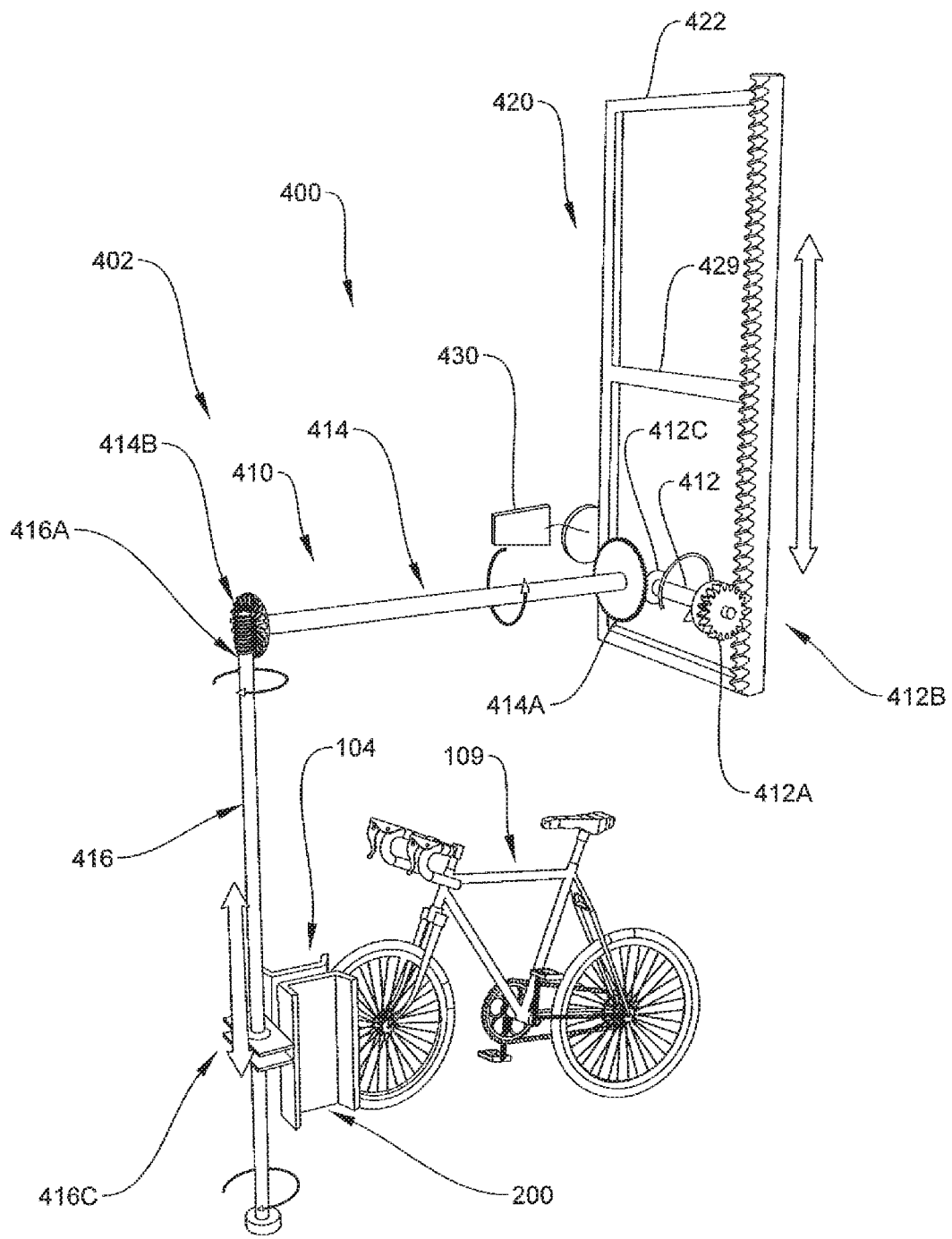
FIG. 19 is a schematic illustration of a drive assembly.

Parts of another embodiment of a bicycle storage assembly is illustrated at 400 in FIG. 19. The bicycle storage assembly 400 also includes a movable element 420 that is movable relative to a track 102 and/or to components a frame (not shown). This embodiment illustrates another drive system 402 for interconnecting the movable element 420 and the carriage 104 that includes clamping plates 200 schematically illustrated. Generally, the movable element 420 is connected to the carriage 104 with interconnected gears used to rotate associated shafts.

In this embodiment, the movable element 420 comprises a door having a rigid frame 422 with bars (one of which is illustrated at 423) and/or other elements such as plates such as but not limited to being made from plastic, glass and/or metal that inhibits access to the bicycle in the storage position. The door 420 moves relative to a track (not shown) provided on a frame (also not shown). It should be understood that a rigid movable door, like door 420, can be incorporated in any of the embodiments herein described.

The drive system 402 includes a plurality of interconnected shafts 410, comprising shafts 412, 414 and 416. Shaft 412 comprises a pinion gear 412A that mates with a gear rack 412B secured to the door 420. At an end opposite pinion gear 412A, a gear 412O mates with a gear 414A connected to shaft 414. Shafts 412 and 414 are typically located above the bicycle 109. At an end opposite gear 414A, a gear 414B mates with a gear 416A of shaft 416. This embodiment illustrates that the mechanism to lift and lower the carriage 104 can comprise an actuator, herein taking the form generally of a ball screw where shaft 416 is a screw shaft and carriage 104 includes a ball or nut 416C having threads to threadably mate with the threads of the shaft 416. In this embodiment the shaft 416 also serves as a track for the carriage 104 guiding the carriage 104; however if desired, additional longitudinal guides not shown can be provided to ensure the orientation of the carriage 104 is maintained and is not rotated as it is lifted and lowered. In another embodiment not shown, interconnection of shafts 412 and 416 can be with a flexible member such as a cable and/or a chain. It should be noted that counterweights can be added if needed to the movable element 420 and/or the carriage 104 depending on the mass of the movable element 420 versus the carriage 104 with the bicycle 109. The counterweights can be integrated into the movable element 420 and/or the carriage 104, or be separate elements.

If desired, a motor can be included anywhere in the drive system 402 to aid and/or provide all the power needed to raise and lower the door 420 and carriage 104. In the embodiment illustrated, a motor 430 is illustrated as being operatively connected to gear 414A; however, this should not be considered limiting in that a motor can be operatively connected to any of the gears of or to the shafts 412, 414 or 416 as desired.

Figure 20:
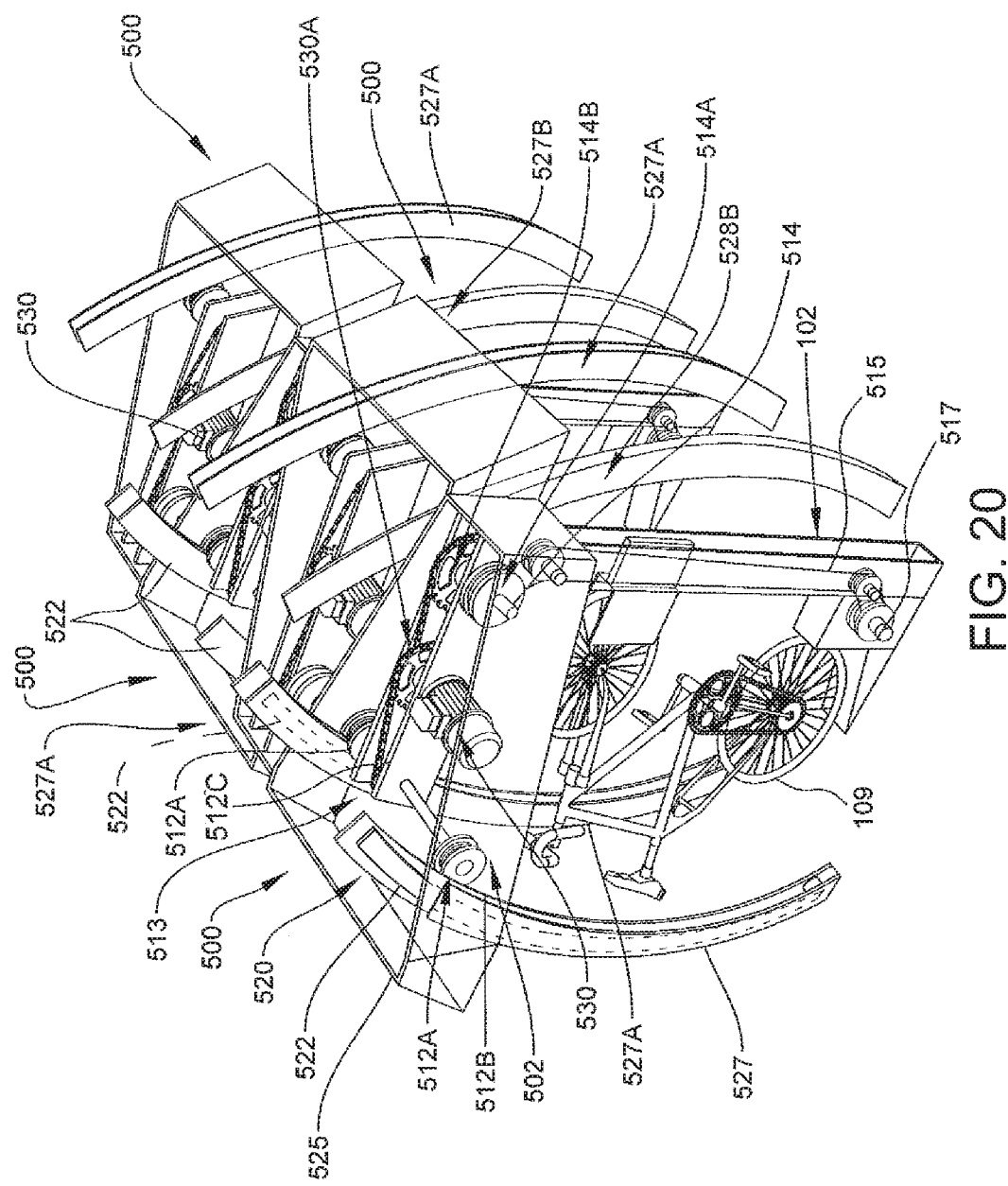
FIG. 20 is a schematic perspective view of another bicycle storage assembly having nested at least partial enclosures.

Parts of another embodiment of a bicycle storage assembly is illustrated at 500 in FIG. 20. The bicycle storage assembly 500 also includes a movable element 520 that is movable relative to a track 102 and/or to components a frame represented herein by top support 525 and guide tracks 527 for movable element 520 herein represented by rigid frame members 522. It should be noted in this embodiment the movable element 520 a rigid door (represented by frame members 522) which can be curved and travel in a curved path, and it should be understood a rigid movable element comprising a door is not limited to the vertical linear movement as depicted with door 420 in the previous embodiment.

In this embodiment a drive system 502 comprises a sprocket and cable system. Generally, shaft 512 is interconnected to shaft 514 with a flexible member 513 herein comprising a chain 515. Shaft 512 has at least one and herein two cable drums 512A for winding and unwinding a cable 512E connected to the movable element 520, herein to frame members 522. A sprocket 512C is operatively connected to the flexible member 513. The flexible member 513 is also operatively connected to shaft 514 with a sprocket 514B that herein also includes a cable drum 514A. The cable drum 514A drives a cable 515 that is connected to the carriage 104, which in one embodiment as illustrated comprises a cable loop where a lower cable drum 517 is also provided at a lower end of track 102. In this manner, the carriage 104 with the bicycle 109 thereattached is driven both upwardly and downwardly. If desired, the lower cable drum 517 can be omitted where the mass of the carriage 104 and bicycle 109 have enough mass to pull the carriage 104 downwardly from the storage position to the loading position.

This embodiment also shows that nesting arrangement described above where storage assemblies have a wider front or access portion 527A comprising the movable element 520 through which the bicycle is inserted into or withdrawn from the corresponding storage assembly 500 and a narrower lift or rear portion 527B comprising the track 102 and carriage 104. This allows the storage assemblies 500 to be placed adjacent to each other in an alternating orientation so as to minimize the floor space when multiple storage assemblies 500 are present.

As with all the embodiments, a power source herein a motor (hydraulic, pneumatic or electric) 530 can also be provided if desired. In this exemplary embodiment, the motor 530 is operatively connected to the flexible member 523 using a sprocket 530A.

Figure 21:
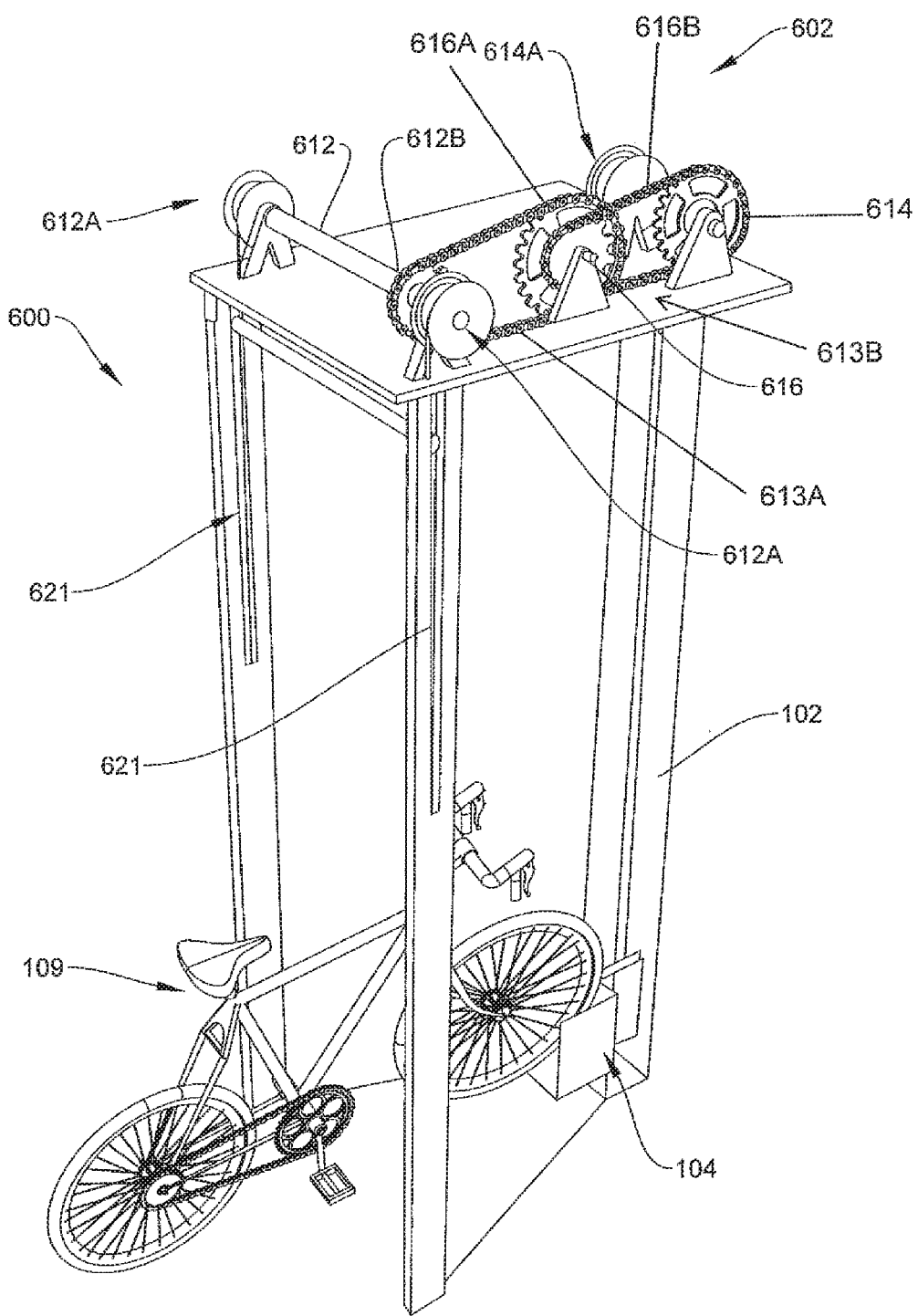
FIG. 21 is a schematic illustration of another drive assembly.

In the embodiment of FIG. 21, a storage assembly 600 includes an alternative drive system 602 comprising two flexible members 613A and 613B, herein depicted as chains, that interconnects a shaft 612 used to lift and lower a movable element (such as a rigid door not shown but can be similar to door 420 if desired) to a shaft 614 operatively coupled to carriage 104 herein with a cable drum 614A. In this embodiment, shaft 612 includes at least one and preferably two cable drums 612A connected with cables to the movable element represented by lift bars 621 to which the door described above would be attached. A sprocket 612B of shaft 612 is coupled to a transition or intermediate shaft 616 having a two sprockets 616A and 616B, which are of different size. Sprockets 616A and 616B being of different size thus controls the rotation speed of shaft 612 relative to the rotational speed of shaft 614. This difference in sprocket ratios between sprockets 616A and 616B enables the carriage 104 to move a larger distance than the distance moved by the movable element that inhibits access to the bicycle 109 in the storage position.

Figure 22:
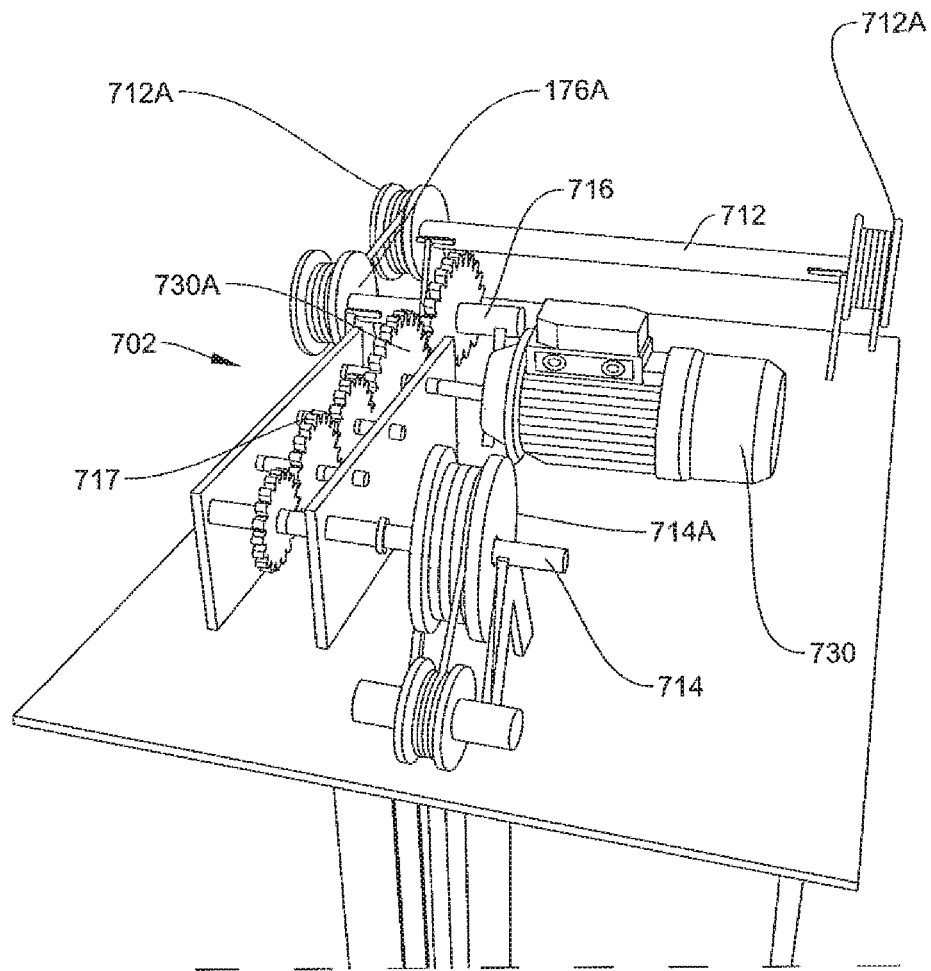
FIG. 22 is a perspective view of another drive assembly.

FIG. 22 illustrates yet another drive system 702 interconnecting a shaft 712 (coupled to a movable element, not shown, herein using cable drums 712A) to a shaft 714 coupled to a carriage (not shown) also using a cable drum 714A. In this embodiment, a plurality of interconnected gears 717 provide a net gear ratio such that the rotational speed of the shaft 712 is less than the rotational speed of shaft 714 such that the carriage will move a larger distance than the movable element coupled to the shaft 712. Although not required, a power source herein motor 730 is operatively coupled to the gears 717 with a gear 730A to lift and lower the movable element and carriage with a bicycle, or to assist with the lifting and lowering. In this embodiment, an intermediate shaft 716 having a cable drum 716A is coupled to shaft 712 with a cable that, if desired can also be connected to the movable element.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A bicycle storage assembly comprising:
a frame;
a track mounted to the frame so as to have lower end and an upper end; and
a carriage movable on the track from a loading position at the lower end of the track to a storage position at the upper end of the track, the storage position being elevated above the loading position, the carriage including a support configured to hold one of a front tire and wheel assembly or a rear tire and wheel assembly of a bicycle in the storage position where the other of the front tire and wheel assembly or the rear tire wheel assembly not being held by the support is located below the front tire and wheel assembly or the rear tire and wheel assembly on the support, the support comprising a pair of clamping members at least one of the clamping member being configured to move toward and away from the other clamping member, the clamping members being configured to frictionally engage opposed side surfaces of a tire of the bicycle with the tire clamped between the clamping members to hold the bicycle in the storage position, the clamping members being devoid of any element that extends over an inside circumferential surface of a rim of the front or rear tire and wheel assembly in the storage position.

2. The bicycle storage assembly of claim 1 wherein the carriage includes a rotatable element movable with the carriage, the rotatable element connected to the at least one clamping member, the rotatable element rotating to move the at least one clamping member toward and away from the other clamping member.

3. The bicycle storage assembly of claim 2 wherein each of the clamping members move toward and away from each other, and wherein the carriage includes a second rotatable element movable with the carriage, the second rotatable element connected to the other clamping member, the second rotatable element rotating to move the other clamping member toward and away from the at least one clamping member.

4. The bicycle storage assembly of claim 2 wherein the carriage includes a second rotatable element movable with the carriage, the second rotatable element connected to the at least one clamping member at a location spaced apart from the rotatable element, the second rotatable element rotating to move the at least one clamping member toward and away from the other clamping member.

5. The bicycle storage assembly of claim 1 wherein the carriage includes a spring operably coupled to the at least one clamping member, the spring configured to bias the at least one clamping member away from the other clamping member.

6. The bicycle storage assembly of claim 1 wherein the frame includes an access opening for placing the bicycle in the loading position.

7. The bicycle storage assembly of claim 6 and further comprising a door configured to close the access opening and enclose the bicycle within the frame when the door of the enclosure is in a closed position.

8. The bicycle storage assembly of claim 6 wherein the frame has sides forming an at least a partially enclosed space, the at least a partially enclosed space having a first portion and a second portion each extending vertically and of a length to extend along opposite sides of the bicycle in the storage position so as to inhibit removable of the bicycle in the storage position, the first portion being narrower in width than the second portion, the width being transverse to a vertical direction, the track being disposed in the first portion, the access opening being in the second portion.

9. The bicycle storage assembly of claim 8 wherein a width of the first portion is approximately one half a width of the second portion.

10. The bicycle storage assembly of claim 9 wherein the width of the first portion is configured to accommodate a complete width of pedal crank assembly of a bicycle from a remote end of a left hand pedal to a remote end of a right hand pedal in at least the storage position.

11. The bicycle storage assembly of claim 8 and further comprising:
a second track and a second set of sides forming a second at least partially enclosed space, the second at least partially enclosed space having another first portion and another second portion each extending vertically and configured to inhibit removal of a second bicycle when disposed therein, the second at least partially enclosed space having a second access opening in the another second portion for placing second bicycle therein, the another first portion being narrower in width than the another second portion, wherein the second track is disposed in the another first portion of the second at least partially enclosed space, the second set of sides forming the second at least partially enclosed space on a first side of the at least partially enclosed space; and
wherein the access opening and the second access opening face in opposite directions.

12. They bicycle storage assembly of claim 11 and further comprising:
a third track and a third set of sides forming a third at least partially enclosed space, the third at least partially enclosed space having a further first portion and a further second portion each extending vertically and configured to inhibit removal of a third bicycle when disposed therein, the third at least partially enclosed space having a third access opening in the further second portion for placing the third bicycle therein, the further first portion being narrower in width than the further second portion, wherein the third track is disposed in the further first portion of the third at least partially enclosed space, the third set of sides forming the third at least partially enclosed space on a second side of the at least partially enclosed space opposite the first side of the at least partially enclosed space; and
wherein the second and third access openings of the second and third at least partially enclosed spaces face in a first direction and the access opening of the at least partially enclosed space faces in a second direction opposite the first direction.

13. The bicycle storage assembly of claim 12 wherein a first set of common sides separates the at least partially enclosed space from the second at least partially enclosed space, and wherein a second set of common sides separate the at least partially enclosed space from the third at least partially enclosed space.

14. The bicycle storage assembly of claim 2 wherein each of the clamping members move toward and away, wherein the carriage includes a second rotatable element movable with the carriage, the second rotatable element connected to the at least one clamping member at a location spaced apart from the rotatable element, the second rotatable element rotating to move the at least one clamping member toward and away from the other clamping member, and wherein the carriage includes a third rotatable element and a fourth rotatable element movable with the carriage, each of the third and the fourth rotatable elements each connected to the other clamping member and rotatable to move the other clamping member toward and away from the at least one clamping member, the third rotatable element connected to the other clamping member at a location spaced apart from the fourth rotatable element.

15. The bicycle storage assembly of claim 14 and a connecting rod connecting the rotatable element to the at least one clamping member, a second connecting rod connecting the second rotatable element to the at least one clamping member, a third connecting rod connecting the third rotatable element to the other clamping member, a third connecting rod connecting the third rotatable element to the other clamping member, a first drive link connected to the rotatable element and the second rotatable element, wherein linear movement of the first drive link rotates the rotatable element and the second rotatable element, and a second drive link connected to the third rotatable element and the fourth rotatable element, wherein linear movement of the second drive link rotates the third rotatable element and the fourth rotatable element.

16. The bicycle storage assembly of claim 15 the carriage includes a first spring operably coupled to the at least one clamping member, the first spring configured to bias the at least one clamping member away from the other clamping member, and a second spring operably coupled to the other clamping member, the second spring configured to bias the other clamping member away from the at least one clamping member.

17. A bicycle storage assembly, comprising;
a frame
a track mounted to the frame so as to have a lower end and an upper end;
a carriage movable on the track from a loading position at the lower end of the track to a storage position at the upper end of the track, the storage position being elevated above the loading position, the carriage including a support configured to hold one of a front tire and wheel assembly or a rear tire and wheel assembly of a bicycle in the storage position where the other of the front tire and wheel assembly or the rear tire wheel assembly not being held by the support is located below the front tire and wheel assembly or the rear tire and wheel assembly on the support; and
a frame having sides forming an at least a partially enclosed space, the at least a partially enclosed space having a first portion and a second portion each extending vertically and configured to inhibit removal of the bicycle in the storage positon, the second portion having an access opening for placing the bicycle in the loading position, the first portion being narrower in width than the second portion, the width being transverse to a vertical direction, wherein the track is disposed in the first portion, wherein the first portion is configured such that the front tire and wheel assembly and the rear tire and wheel assembly of the bicycle extend from the second portion into the first portion in the storage position, and wherein the second portion is configured to receive handle bars of the bicycle in the storage position.

18. The bicycle storage assembly of claim 17 further comprising:
a second track, wherein the second track is mounted to the frame so as to have a second lower end and a second upper end; and
wherein the frame has sides forming a second at least a partially enclosed space, the second at least a partially enclosed space having a narrower portion and a wider portion each extending vertically and configured to inhibit removal of a second bicycle when disposed therein, the wider portion having a second access opening for placing a second bicycle therein, the narrow portion being narrower in width than the wider portion, the width being transverse to the vertical direction, and wherein the second track is disposed in the narrower portion, the access opening and the second access opening facing in opposite directions.

19. A bicycle storage assembly comprising:
a frame;
a track mounted to the frame so as to have a lower end and an upper end;
a carriage movable on the track from a loading position at the lower end of the track to a storage position at the upper end of the track, the storage position being elevated above the loading position, the carriage including a support configured to hold one of a front tire and wheel assembly or a rear tire and wheel assembly of a bicycle in the storage position where the other of the front tire and wheel assembly or the rear tire wheel assembly not being held by the support is located below the front tire and wheel assembly or the rear tire and wheel assembly on the support; and
an enclosure having sides forming an enclosed space, the enclosed space having a vertically extending first portion and a vertically extending second portion, the first portion being narrower in width than the second portion, the first portion opening to the second portion, the enclosure comprising a movable member forming a side of the second portion opposite the first portion, the movable member enclosing the bicycle within the enclosure when the movable member of the enclosure is in a closed position.

20. The bicycle storage assembly of claim 19 wherein the track is vertically disposed in the first portion, wherein the first portion is configured to receive at least a portion of a front tire and wheel assembly and at least a portion of a rear tire and wheel assembly when the bicycle is in the storage position, and wherein the second portion is configured to receive handle bars of the bicycle when the bicycle is in the storage position.

* * * * *